(12) United States Patent
López et al.

(10) Patent No.: US 10,938,222 B2
(45) Date of Patent: Mar. 2, 2021

(54) CELL BALANCING METHOD AND SYSTEM

(71) Applicant: LITHIUM BALANCE A/S, Smorum (DK)

(72) Inventors: Alfredo Quijano López, Valencia (ES); Vincente Gavara Padilla, Valencia (ES); José Manuel Torrelo Ponce, Valencia (ES); Carlos Blasco Llopis, Valencia (ES); Javier Monreal Tolmo, Valencia (ES); Karl Ragnar Vestin, Sodra Sandby (SE)

(73) Assignee: Lithium Balance A/S, Smørum (DK)

( * ) Notice: Subject to any disclaimer, the term of this patent is extended or adjusted under 35 U.S.C. 154(b) by 31 days.

(21) Appl. No.: 16/093,859

(22) PCT Filed: Apr. 12, 2017

(86) PCT No.: PCT/DK2017/000007
§ 371 (c)(1),
(2) Date: Oct. 15, 2018

(87) PCT Pub. No.: WO2017/178023
PCT Pub. Date: Oct. 19, 2017

(65) Prior Publication Data
US 2019/0109468 A1 Apr. 11, 2019

(30) Foreign Application Priority Data
Apr. 16, 2016 (DK) .................................. 201600228

(51) Int. Cl.
*H02J 7/00* (2006.01)
*H02M 3/335* (2006.01)

(52) U.S. Cl.
CPC .......... *H02J 7/0014* (2013.01); *H02J 7/0013* (2013.01); *H02J 7/0021* (2013.01); *H02J 7/007* (2013.01);
(Continued)

(58) Field of Classification Search
CPC ...... H02J 7/0013; H02J 7/0014; H02J 7/0021; H02J 7/0031; H02J 7/007; H02J 7/0018;
(Continued)

(56) References Cited

U.S. PATENT DOCUMENTS 5,710,504 A * 1/1998 Pascual ................. H02J 7/0018
180/65.8
8,207,740 B2 * 6/2012 Lin ...................... H01M 10/441
180/207.3

(Continued)

FOREIGN PATENT DOCUMENTS

EP 1289096 A2 3/2003
EP 2075892 A2 7/2009
(Continued)

OTHER PUBLICATIONS

Zhang et al.; "Hybrid balancing in a modular battery management system for electricdrive vehicles"; 2017 IEEE Energy Conversion Congress and Exposition (ECCE); | Conference Paper | Publisher: IEEE (Year: 2017).*

(Continued)

*Primary Examiner* — Helen Rossoshek
(74) *Attorney, Agent, or Firm* — Neal, Gerber & Eisenberg LLP; Thomas E. Williams; Daniel T. Orean

(57) ABSTRACT

The invention relates to a system for battery cell balancing comprising a cell monitoring block (16) configured to monitor the voltage or a related quantity across individual cells ($C_1, C_2, \ldots C_N$) in a battery cell module; a microcontroller (18) configured for monitoring the positive terminal voltage (12) and the negative terminal voltage (13) of said battery cell module, and for monitoring (11) the output current $I_{mod}$ of said module, and monitored cell voltage of said individual cells ($C_1, C_2, \ldots C_N$), where the microcontroller (18) is configured to provide a control signal (20) based at least said positive (Continued)

terminal voltage (12), said negative terminal voltage (13), said output current I.sub.mod of said module, and said monitored cell voltage of said individual cells; and a hybrid module balancing block configured to provide either an active or a passive cell balancing or a combination of active and passive cell balancing of the cells (C.sub.1, C.sub.2, . . . C.sub.N) in the specific module under the control of the control signal provided by the microcontroller. The invention further relates to a method for battery cell balancing in a battery comprising one or more modules each comprising one or more cells.

15 Claims, 25 Drawing Sheets

(52) U.S. Cl.
CPC ...... *H02J 7/00302* (2020.01); *H02M 3/33569* (2013.01); *Y02T 10/70* (2013.01)

(58) Field of Classification Search
CPC ............ H02J 7/00302; H01M 10/441; H01M 10/4207; H01M 10/44; H01M 10/465; H01M 2010/4271; H02M 3/33569; Y02E 60/122; Y02E 10/7055
See application file for complete search history.

(56) References Cited

U.S. PATENT DOCUMENTS

| | | | | |
|---|---|---|---|---|
| 9,219,367 B2* | 12/2015 | Tsai | ................ | H02J 7/007 |
| 10,386,422 B2* | 8/2019 | Christensen | ............ | B60L 50/64 |
| 2002/0011820 A1 | 1/2002 | Suzuki et al. | | |
| 2006/0022639 A1 | 2/2006 | Moore | | |
| 2006/0078797 A1* | 4/2006 | Munshi | ................. | H01M 4/00 |
| | | | | 429/231.8 |
| 2008/0090133 A1 | 4/2008 | Lim et al. | | |
| 2009/0183763 A1* | 7/2009 | Meyer | ................ | H01L 31/02021 |
| | | | | 136/246 |
| 2012/0274283 A1* | 11/2012 | van Lammeren | ............................ | |
| | | | | H01M 10/4207 |
| | | | | 320/118 |
| 2012/0313439 A1* | 12/2012 | Yamaguchi | ......... | H01M 10/425 |
| | | | | 307/71 |
| 2013/0002203 A1* | 1/2013 | Kuraishi | ............... | H02J 7/0018 |
| | | | | 320/134 |
| 2013/0207613 A1* | 8/2013 | Loncarevic | ........... | H02J 7/0016 |
| | | | | 320/134 |
| 2014/0042980 A1* | 2/2014 | Floros | ................ | H01M 10/441 |
| | | | | 320/134 |
| 2014/0097787 A1 | 4/2014 | Lin | | |
| 2014/0306662 A1* | 10/2014 | Kim | ...................... | H02J 7/0016 |
| | | | | 320/118 |
| 2014/0312848 A1* | 10/2014 | Alexander | ................ | H02J 3/14 |
| | | | | 320/134 |
| 2014/0340023 A1* | 11/2014 | Shu | ....................... | H02J 7/0018 |
| | | | | 320/107 |
| 2014/0354212 A1* | 12/2014 | Sugeno | ................. | H01M 10/46 |
| | | | | 320/103 |
| 2015/0037624 A1 | 2/2015 | Thompson et al. | | |
| 2015/0165913 A1* | 6/2015 | Jacobsen | ................ | B60L 58/27 |
| | | | | 701/22 |
| 2016/0049809 A1* | 2/2016 | Kajitani | ................ | H02J 7/0014 |
| | | | | 320/118 |
| 2016/0301221 A1* | 10/2016 | Kaminsky | ............. | B60L 3/0046 |
| 2017/0219660 A1* | 8/2017 | Christensen | ............ | B60L 58/16 |
| 2017/0338672 A1* | 11/2017 | Hasenkopf | ............ | H02J 7/0019 |
| 2018/0248386 A1* | 8/2018 | Hale | ..................... | H02J 7/0014 |
| 2019/0103750 A1* | 4/2019 | Kristensen | ............ | H02J 7/0026 |
| 2019/0280488 A1* | 9/2019 | Tang | ..................... | H01M 10/48 |

FOREIGN PATENT DOCUMENTS

| | | |
|---|---|---|
| EP | 2787594 A2 | 10/2014 |
| WO | WO 2008/137764 A1 | 11/2008 |
| WO | WO 2017/178023 A1 | 10/2017 |

OTHER PUBLICATIONS

Lee et al.; "Comparison of passive cell balancing and active cell balancing for automotive batteries"; IEEE Vehicle Power and Propulsion Conference;| Conference Paper | Publisher: IEEE (Year: 2011).*

Dian et al.; "A Solar Power-Assisted Battery Balancing System for Electric Vehicles"; IEEE Transactions on Transportation Electrification; | vol. 4, Issue: 2 | Journal Article | Publisher: IEEE (Year: 2018).*

Linear Technology, "2.5A Monolithic Active Cell Balancer with Telemetry Interface," (LT8584) (Jan. 20, 2014).

Danish Patent and Trademark Office, Danish Application No. PA 2016 00228 (dated Nov. 7, 2016).

European Patent Office, International Preliminary Report on Patentability in International Application No. PCT/DK2017/000007 (dated May 22, 2018).

European Patent Office, International Search Report in International Application No. PCT/DK2017/000007 (dated Oct. 6, 2017).

* cited by examiner

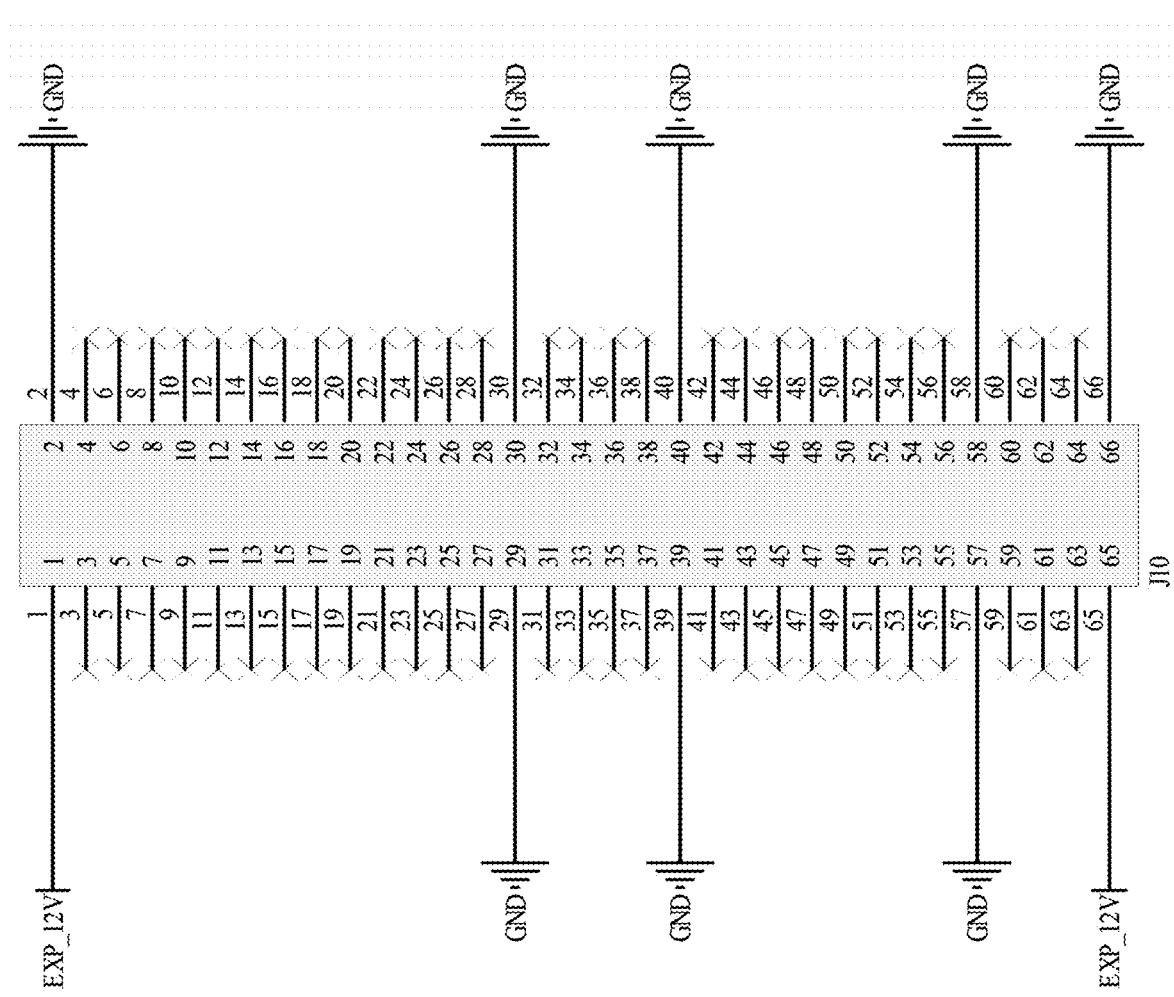

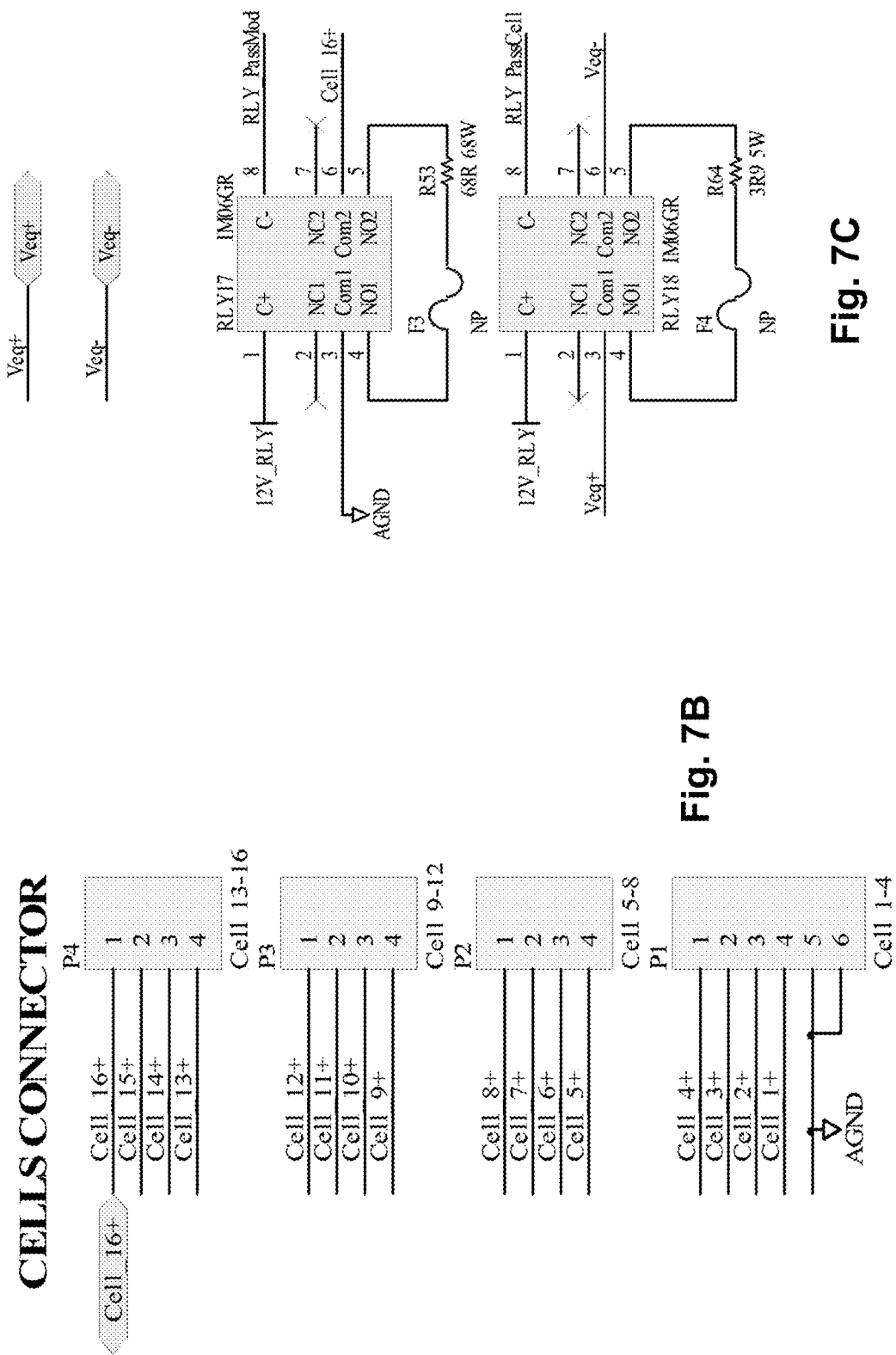

INDICATION LEDS

CELL BALANCING METHOD AND SYSTEM

TECHNICAL FIELD

The present invention relates generally to systems and methods for cell balancing in battery systems and more specifically to such systems and methods that apply a combination of active and passive cell balancing in order to optimize cell balancing under different conditions.

BACKGROUND OF THE INVENTION

Cell balancing systems and methods are known within the art of battery management and such systems and methods are vital in optimizing the performance of batteries composed of a large number of cells such as those required in electrochemical storage systems of medium and large scale, for instance designed to operate in electric vehicles.

The main purpose of such systems and methods is to maintain homogeneous conditions between all cells of the battery, thus allowing optimal operation in terms of efficiency, stored energy and lifetime. In order to reach the desired operating voltage of a battery pack, cells are connected in series. If the cells are perfectly balanced, the total voltage will be equally divided per cell. However, in practice, the cells will be unbalanced. Cell balancing process equalizes the charge on all the cells in the chain and thus increasing battery capacity. This process is required because maximum charge is limited by the highest cell voltage, and maximum discharge is limited by the lowest. Its use is desirable in almost every technology (the only exception is the technology Redox-Flow) and is essential in some cases as in ion-lithium batteries.

During a charging and discharging cycle, batteries in a series string may not operate in a uniform manner. Batteries are inter alia characterized by their internal resistance, which can vary within certain tolerance limits of a given type of battery cell. Batteries with more efficient cells (i.e. with cells having a relatively low internal resistance) tend to have a higher voltage while batteries with less efficient cells remain at a lower voltage. Once the imbalance occurs, it will tend to increase with additional usage. Thus, when charging batteries, some reach full charge long before others. Likewise, weaker cells will tend to discharge much more rapidly than the rest of the pack. This leads to under-utilization of most of the cells. In summary, when these imbalanced batteries are left in use without any control, such as cell equalization, the energy storage capacity decreases severely.

Series-connected battery strings have been used for many applications, such as electric vehicles, hybrid electric vehicles (HEVs), electric scooters, and uninterruptible power supplies. Of these, an HEV battery is severely exposed to a charge and discharge environment. This exposure occurs because an HEV can recover energy from the wheels during regenerative braking (an energy source that was wasted in the past) and reuse it to propel the vehicle at low speeds or provide extra power for high acceleration. This repeated charge and discharge phenomenon aggravates the cell mismatch problem.

The imbalances between cells can be defined in terms of voltage or SOC (state of charge). By their nature, as previously mentioned, if no corrective actions are taken, imbalances for instance due to the internal resistance of cells will increase as time passes and charge and discharge cycles are performed on the battery, which may give rise to the case where one or more elements to reach a state of overcharge or deep-discharge while others still have a valid SOC. These extreme situations can lead to a significant deterioration of the battery that along with other external factors can raise a premature failure of the entire system. The severity and rapidity with which both the imbalance and deterioration occur, largely depends on such factors as:

Process Technology: Some technologies such as Lead Acid or NiCd among others are able to tolerate certain levels of overcharge and/or deep-discharge. In some of these technologies a slight overcharge process is even used to periodically achieve balancing battery. However, other technologies such as Li-Ion, are totally intolerant to overcharge or deep-discharge conditions which may damage the battery, shortening its lifetime, and even causing hazardous situations.

Battery use Cycle: Depending on the overall SOC variation of the charge and discharge currents and temperature, the process of imbalance can vary significantly. For example, in technologies in which a slight overcharge is forced, the use of an incomplete charging cycle which does not provide a 100% charging load is detrimental.

In any case it is necessary to establish a mechanism to restore the balance between all the cells comprising a battery system. Even in the case of technologies that allow balancing by overcharge, they benefit both concerning efficiency and extension of life of the system.

In this sense in battery systems of a certain size (number of series-connected elements), it is desirable (or perhaps even necessary) to use balancing techniques. The benefits obtained by using equalization systems comprise (i) extension of the life span of the battery system; (ii) increased efficiency of the battery system; (iii) increased usable energy of the battery system; and (iv) improved operation safety of the battery system.

It is hence desirable to have access to cell balancing systems and methods that provide optimal cell balancing under all practical operating conditions.

DISCLOSURE OF THE INVENTION

The above and further objects and advantages are according to the present invention obtained by a cell balancing system and a cell balancing method, where the system and method apply a combination of active and passive cell balancing.

Active cell balancing is the method to apply when dissipation of cell energy as heat is to be avoided. Active cell balancing is more efficient than passive cell balancing and does not give raise to the generation of heat and hence makes it possible to apply higher balancing currents than passive balancing.

During normal use the most discharged cells in a given module are balanced obtaining the energy from their specific module.

When a specific module is in a low state of charge (SOC), active cell balancing helps to take advantage of the energy stored in the specific module by raising the SOC of cells having a SOC below the average of that specific module up to the average value and thus allowing to discharge the full module until the minimum allowed SOC for almost every cell, instead of being limited by just one cell that reaches the minimum SOC floor.

During the end of charge process if there is one or a few cells below the SOC average value, active balancing can be used too.

Passive cell balancing can for instance be applied advantageously (at least) in the following situations:

During the end of a charge process passive balancing can be used in order to reduce the SOC of a single or a few cells that are above the SOC average value of the module and then finish the charging process with all the cells at their maximum SOC possible. If during the charging process, only a relatively few cells are insufficiently charged, active balancing can be applied in order to raise their state of charge rapidly. On the contrary, if a relatively few cells are charged above their maximum allowable state of charge, passive balancing can advantageously be applied.

According to a first aspect of the present invention, the above and further objects and advantages are provided with a system comprising:

- a cell monitoring block configured to monitor the voltage or a related quantity across individual cells ($C_1$, $C_2$, ... $C_N$) in a battery cell module;
- a microcontroller configured for monitoring the positive terminal voltage and the negative terminal voltage of the battery cell module, and for monitoring the output current $I_{mod}$ of the module, and monitored cell voltage of the individual cells ($C_1$, $C_2$, ... $C_N$), where the microcontroller is configured to provide a control signal based at least the positive terminal voltage, the negative terminal voltage, the output current $I_{mod}$ of the module and the monitored cell voltage of said individual cells;
- a hybrid module balancing block configured to provide either an active or a passive cell balancing or a combination of active and passive cell balancing of the cells ($C_1$, $C_2$, ... $C_N$) in the specific module under the control of the control signal provided by the microcontroller.

In an embodiment of the first aspect of the invention, the hybrid module balancing block comprises:

- a switching array configured to provide active or passive or a combination of active and passive balancing to one or more of the individual cells ($C_1$, $C_2$, ... $C_N$) in the specific module under the control of the control signal;
- a passive cell balancing means configured to provide the passive balancing under the control of said control signal;
- an active cell balancing means configured to provide the active balancing under the control of the control signal (20).

In an embodiment of the first aspect of the invention, the system comprises a passive module balancing means coupled between the positive and negative terminals of the specific module.

In an embodiment of the first aspect of the invention, the active cell balancing means is a flyback DC/DC converter.

In an embodiment of the first aspect of the invention, the passive cell balancing means is a resistor in series with a switch, such as for instance a MOSFET.

In an embodiment of the first aspect of the invention, the passive module balancing means is a resistor in series with a switch, such as for instance a MOSFET.

In an embodiment of the first aspect of the invention, the flyback DC/DC converter extracts power from all of the cells ($C_1$, $C_2$, ... $C_N$) of a module, and injects a controlled current to balance the most discharged cell until it is in balance with the other cells.

In an embodiment of the first aspect of the invention the controlled current is constant.

In an embodiment of the first aspect of the invention, the microcontroller is a microcontroller in a battery management system (BMS) that manages the overall performance of the battery.

In an embodiment of the first aspect of the invention, active balancing as applied in the modules making up a battery, whereas passive balancing is applied between modules making up the battery.

In an embodiment of the first aspect of the invention, the system comprises module state of charge (SOC) monitoring means or voltage monitoring means that monitors the SOC or voltage of the modules in a battery and when an imbalance between the SOC or voltage is detected between two or more modules, passive balancing between the two or more modules in the battery is performed.

In an embodiment of the first aspect of the invention, the passive balancing between two or more modules in a battery is controlled by the hybrid module balancing block or the battery management system (BMS). According to a second aspect of the invention there is provided a method for battery cell balancing in a battery comprising at least one module comprising a plurality of cells, the method comprising the steps of: —determining if a charging process is in progress;

- choosing a module (M1);
- applying active cell balancing between cells of said module (M1);
- determining if one or more cells are charged above a predefined upper limit;
- if one or more cells are charged above said upper limit, applying passive cell balancing to this or those cells in order to reduce their charge to a value at or below said upper limit;
- when all cells within said module (M1) are charged, determine if there are further modules (M2, M3 ... ) in the battery, and if this is the case repeat the above steps for the remaining modules (M2, M3 ... );
- when all modules of the battery have been charged, determine if there is an imbalance between the state of charge or a similar parameter of the respective modules in the battery, and if this is the case, apply either passive or active balancing between respective modules in order to reduce said imbalance between modules to a required level.

In an embodiment of the second aspect of the invention, the active balancing as applied in modules making up a battery, whereas passive balancing is applied between modules making up the battery.

In an embodiment of the second aspect of the invention, the state of charge (SOC) or voltage is monitored by monitoring means that monitors the SOC or voltage of two or more modules in a battery and when an imbalance between the SOC or voltage is detected between two or more modules, passive balancing between the two or more modules in the battery is performed.

Further features of the invention will appear from the following detailed description of the invention and from the figures.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein

FIG. 5A through G show a schematic diagram of the interface with a Hercules microcontroller used in an embodiment of the invention;

FIG. 7A through G show a schematic diagram of a relay selection circuitry comprising a de-multiplexer used in an embodiment of the invention;

DETAILED DESCRIPTION OF THE INVENTION

A non-limiting embodiment of a cell balancing system according to the invention is described in detail in the following. It is however understood that the invention may be implemented in other ways and that all such embodiment of the invention will fall within the scope of protection defined by the patent claims.

It is expressly noted that although specific numerical values for various parameters etc. will be mentioned in the following, such specific numerical values are only to be regarded as examples and they do not, consequently, limit the scope of the patent protection.

Figure 1:
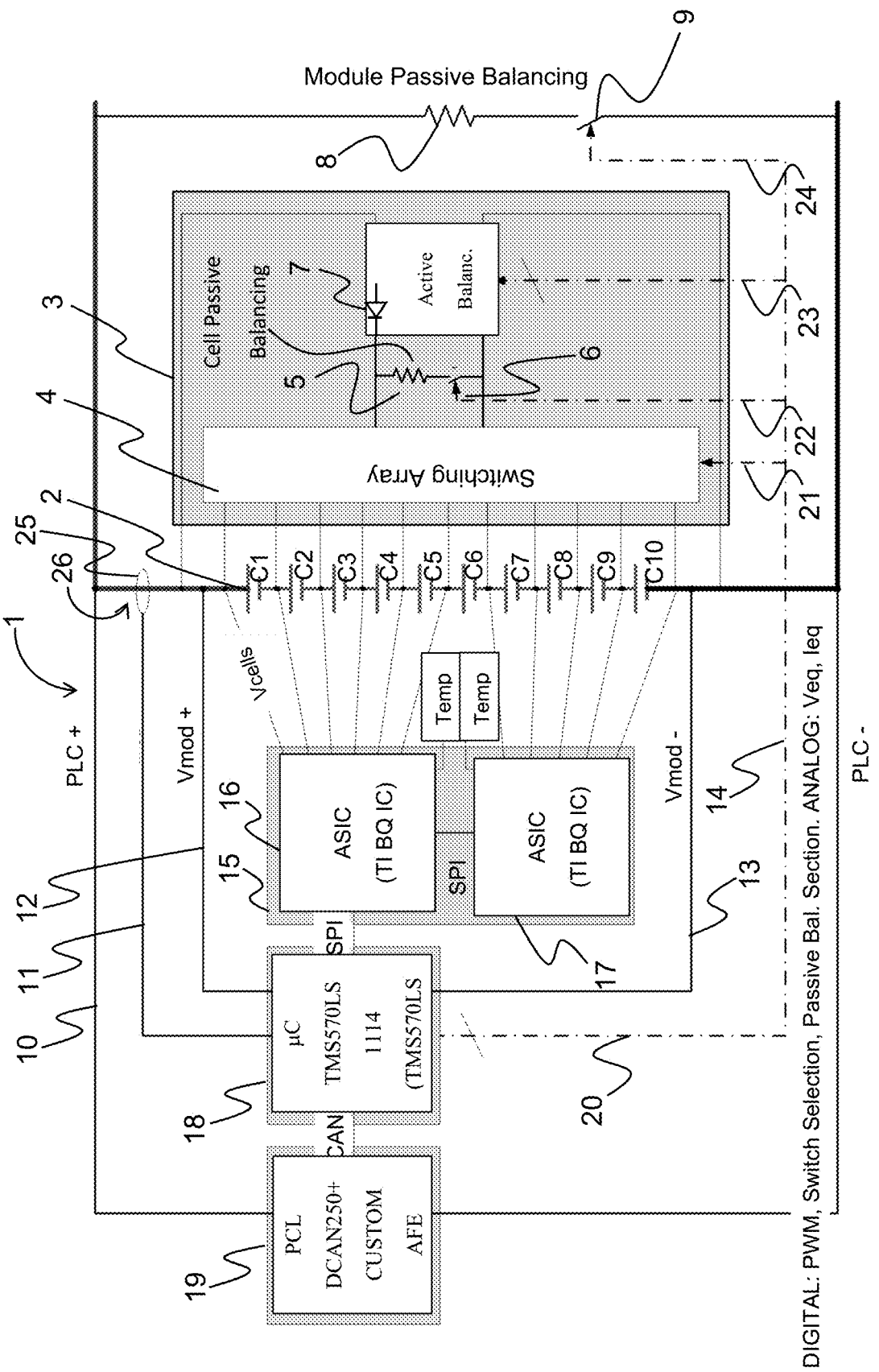
FIG. 1 shows an embodiment of a cell balancing system according to the present invention.

With reference to FIG. 1 there is shown an embodiment of a cell balancing system according to the present invention generally indicated by reference numeral 1 comprising means for applying a combination of active and passive cell balancing.

The system shown in FIG. 1 comprises a battery module that in the shown embodiment contains a series connection of ten cells C1, C2, ... C10. It is of cause understood that a different number of cells could be present in the module and that the principles of the invention would apply equally well to such modules.

It is further understood that although the term "module" is used repeatedly in the description of the embodiment shown in FIG. 1, the present invention is not restricted to one or more physical modules making up a total battery. A battery could thus simply comprise a number of cells coupled in series without any subdivision into specific modules or a module may simply be a fictive subdivision of a given number of cells in a battery. Thus, reference to the term "module" implies no restriction to the scope of the present invention.

The system comprises a hybrid module balancing block 3 that comprises a switching array 4, a passive balancing means, such as the resistor 5 that can be activated through a controllable switch 6, such as a MOSFET, and an active balancing device, such as a DC/DC converter 7.

Coupled across the entire module there is further connected a module passive balancing means, such as the resistor 8 that can be activated through the switch 9, such as a MOSFET.

The switching array 4, the cell passive balancing means 5 and 6, the DC/DC converter 7 and the module passive balancing means 8 and 9 are controlled by appropriate control signals, as symbolically indicated be control lines 20 through 25.

The voltages over each respective cells C1 through C10 are measured by means of a cells monitoring block 15 that in the shown embodiment comprises the two ASIC's 16 and 17 connected to the terminals of the respective cells through cell voltage measuring lines Vcells.

In order to optimize the performance of the system according to this embodiment of the invention and to maximize the balancing current and thus reducing the balancing time, the flyback converter can be controlled from the main microcontroller in the battery management system (BMS). An example of such a microcontroller is the HERCULES MCU 32-bit ARM Cortex R4 manufactured by Texas Instruments. The system and method according to the present invention can be implemented in the BMS main microcontroller, but could alternatively be implemented in a separate microcontroller. The controlling microcontroller is in the shown embodiment designated by reference numeral 18 and is in connection with the ASIC's 16 and 17 in the cells monitoring block 15 through the serial peripheral interfaces SPI.

The microcontroller 18 receives a signal indicating the positive module voltage Vmod+ via signal line 12 and a signal indication the negative module voltage Vmod− via signal line 13. Further, the microcontroller 18 received a signal indicating the output current $I_{mod}$ 26 from the module via signal line 11. The output current 26 is measured by suitable means as symbolically indicated by 25. The microcontroller 18 provides, based inter alia on these signals the control signal 20 to the various functional blocks of the balancing system, i.e. the control signals 21, 22, 23 and 24.

This Switched DC/DC converter that is used in the shown embodiment of the invention is based on a "Module to Cell" topology and allows, without too much extra costs, to monitor the current injected on each cell while balancing, thus enabling to obtain a better SOC considering the current injected during the balancing process.

The DC/DC Converter 7 is an isolated flyback converter that extracts the power from all the module cells (C1 through C10 in the embodiment shown in FIG. 1) and injects a controlled constant current (CC) to balance the most discharged cell until it is in balance with the other cells. The connection of the isolated flyback converter to the most discharged cell is done with an array of relays 4 and only one can be switched at the same time to avoid dangerous short circuits.

The design of the DC/DC converter that can be used in embodiments of the invention is described in some detail in the following. The converter can as mentioned above for example be implemented into the HERCULES microcontroller, if desired.

The converter control needs an analog signal for measuring the balancing current (and close the feedback loop for control), a PWM digital output, and a digital output per cell (built using an external de-multiplexing system) to activate the switches that connect the DC/DC converter to the cell that requires balancing.

The Switched DC/DC converter according to an embodiment of the invention is based on a "Module to Cell" topology and allows, without limited extra costs, to monitor the current injected on each cell while balancing, thus making it possible to obtain a more optimal state of charge (SOC) considering the current injected during the balancing process.

Figure 2:
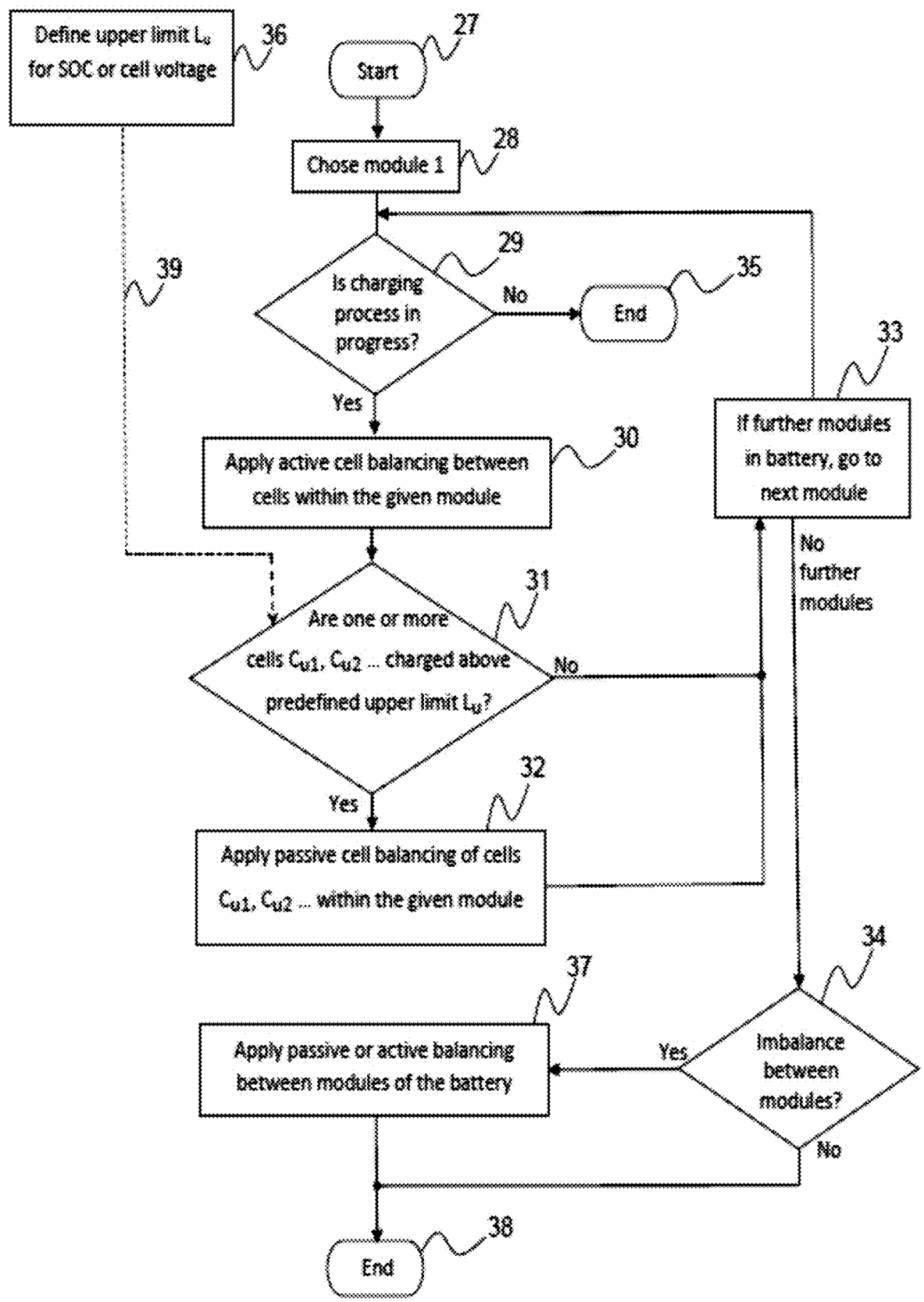
FIG. 2 shows a flow chart illustrating the basic steps of an embodiment of a method according to the present invention.

Referring to FIG. 2 there is shown a flowchart illustrating an embodiment of a cell balancing method according to the invention that can for instance be applied for a battery comprising one or more modules, each comprising a number of cells, as for instance shown in FIG. 1.

The balancing method is initiated at step 27 and a given battery module is chosen at step 28. In step 29 it is determined by appropriate means if a charging process is in taking place and if this is the case the method proceeds to step 30, thereby applying active cell balancing between cells in the given module, i.e. the module chosen in step 28.

Towards the end of the charging it may happen that one or a few cells of the given module are charged above a predefined upper limit $L_u$ of SOC or cell voltage. If this is detected in step 31, according to the embodiment of the method shown in FIG. 2, that this or these cells are charged above the predefined upper limit $L_u$, passive cell balancing is applied to these cells in step 32 in order to reduce their charge to the required value. If it is determined in step 31 the no cells are above the upper limit the process proceeds to step 33 in which it is determined if further modules that have to be charged are present in the battery, after which the above described process is repeated for the next module.

If no further modules are present in the battery, it is in step 34 determined, if there is an imbalance between the SOC of voltage between modules. If this is the case, the process applies either passive or active balancing between modules, for instance (in case of passive balancing) by means of the resistor 8 shown in FIG. 1. This inter module balancing proceeds until a required balance between modules have been obtained, after which the process terminates in step 38.

In functional block 36, the upper limit $L_u$ can be determined and provided as indicated by 39 to the functional step 31.

Figure 3A:
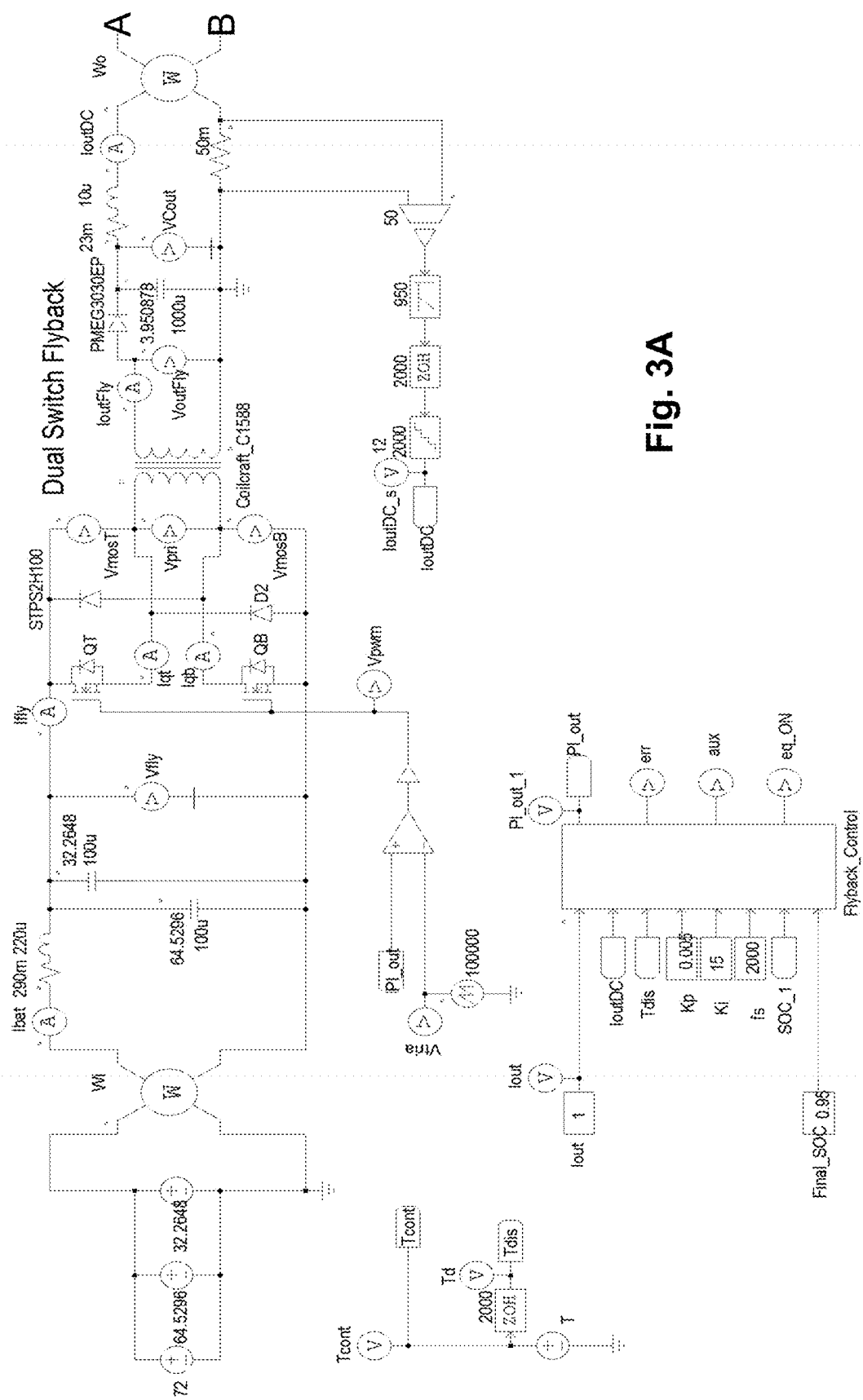
FIGS. 3A and B show a schematic diagram of an isolated fly-back converter used in embodiments of the present invention.
Figure 3B:
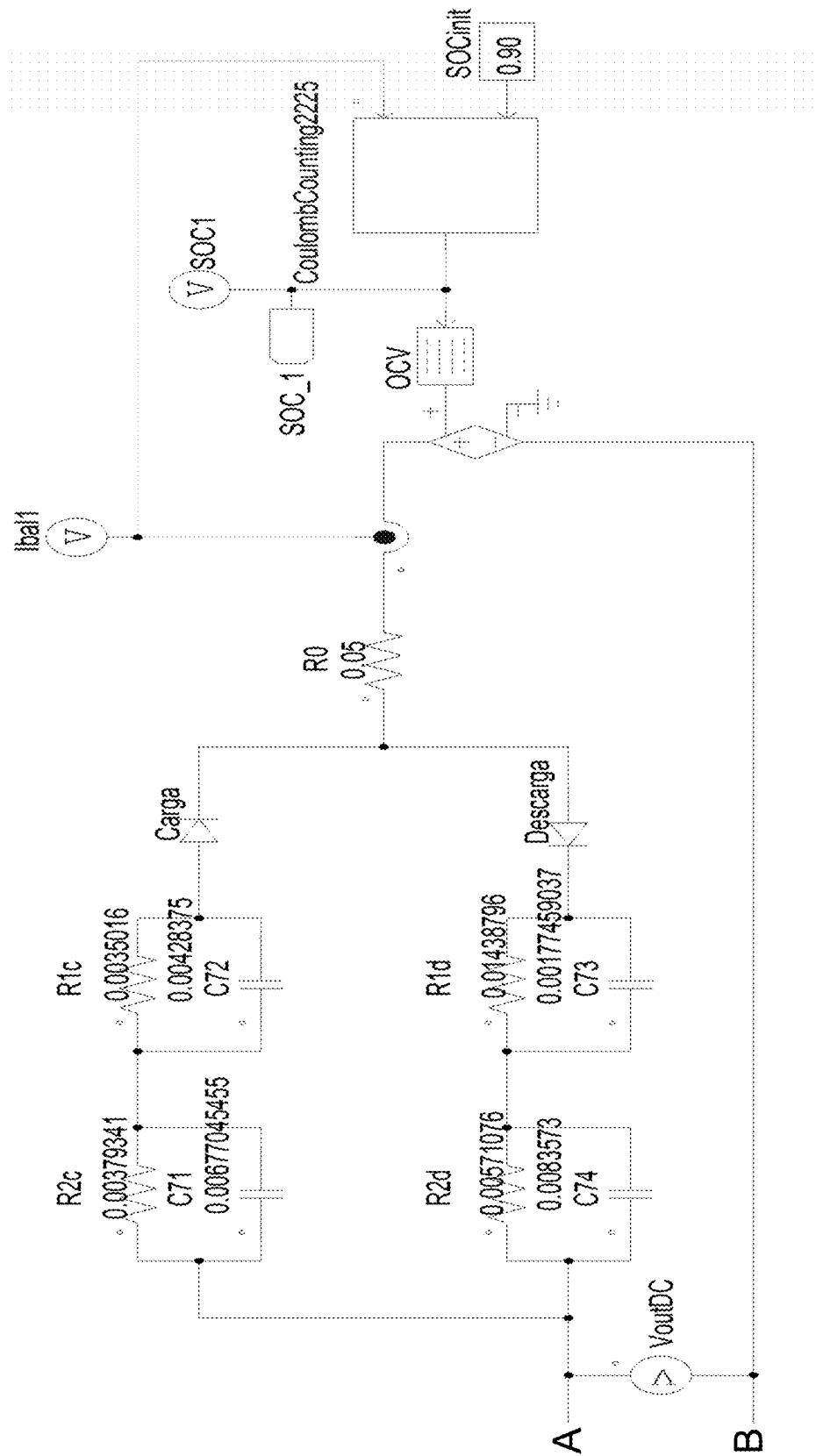

Referring to FIGS. 3A and B there is shown a schematic circuit diagram of an embodiment of an isolated flyback converter circuitry (MOSFETS, filters, isolation transformer, etc.), where the flyback Control block and the cell C1, C2 and C3 connected to the output of the flyback converter. It is noted that other numbers of cells than the three actually shown in the figure could be used according to the invention. There are other parts in the schematic used to measure currents and voltages all along the circuit. The energy needed to correct the unbalance status of one specific cell is obtained from all the cells of the module and is then injected on that specific cell.

The DC/DC converter topology is an isolated flyback converter, acting like a buck converter with isolation. The PWM signal allows controlling the output current and voltage of the DC/DC converter.

An objective of the system and method of the present invention is to re-charge the unbalanced cell with a controlled current, for instance a 1 A current, that is extracted from the full array of cells that composes a module.

In order to design the control algorithm that later will be implemented in the HERCULES microcontroller, the simulation schematic includes filtering and discretization of the output current feedback measurement. This resembles the way an analog stage and an Analog to Digital Converter (ADC) work in a real electronic system. Also, the flyback control block works in the way it is expected to work in the HERCULES microcontroller, this means that the control code is executed one time for each sample acquisition of the analog signal.

The sampling frequency has in the results of the simulations shown in the following been set to 2 kHz and the resolution of the ADCs is 12 bits. The output current will be sensed using a shunt resistor (in this example 50 mOhm) and an instrumentation amplifier (for instance INA282) with a fixed gain of 50× in the results shown in the following. The PWM switching frequency has been set at 100 kHz, but other switching frequencies could also be used.

Figure 4:
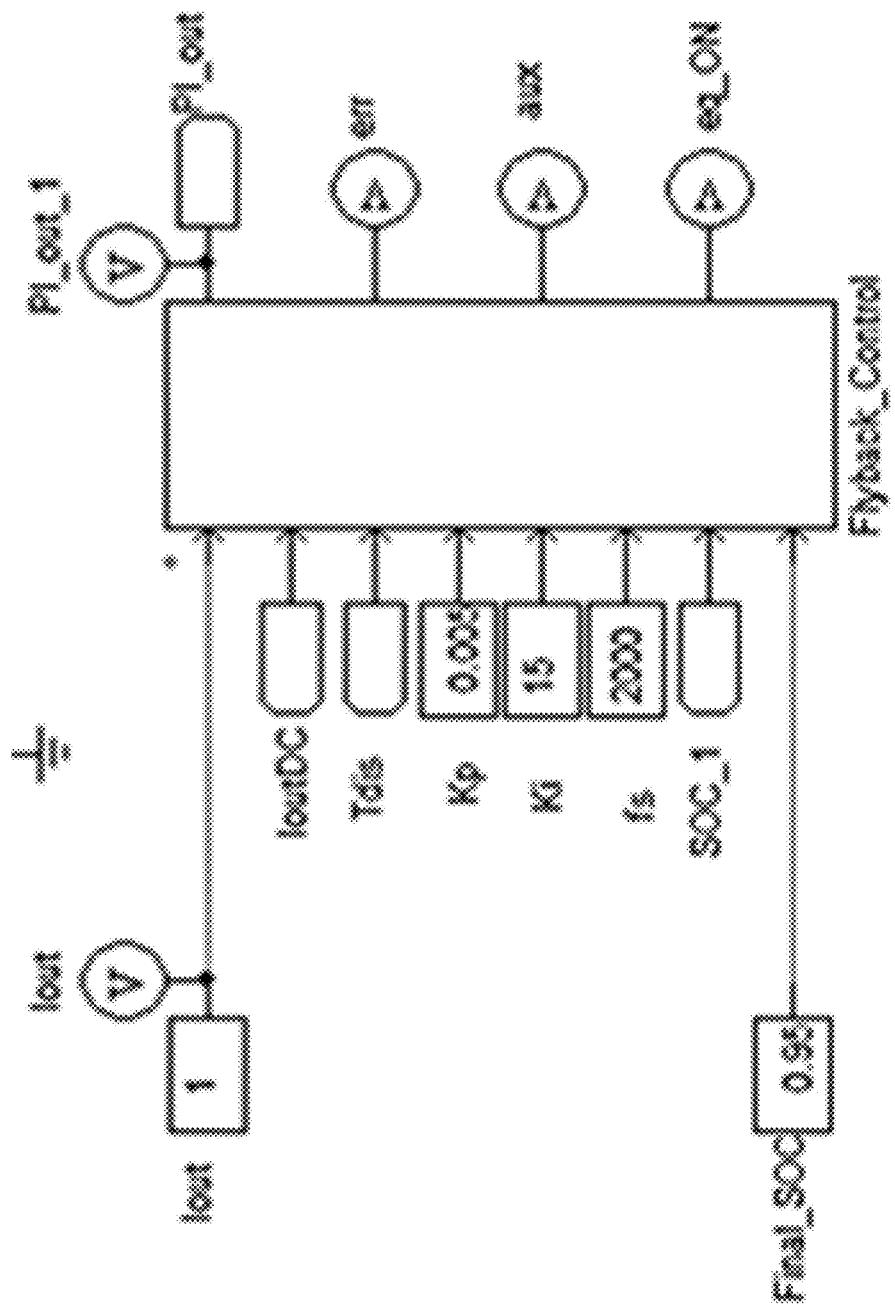
FIG. 4 shows a fly-back control block used in embodiments of the present invention.
Figure 5B:
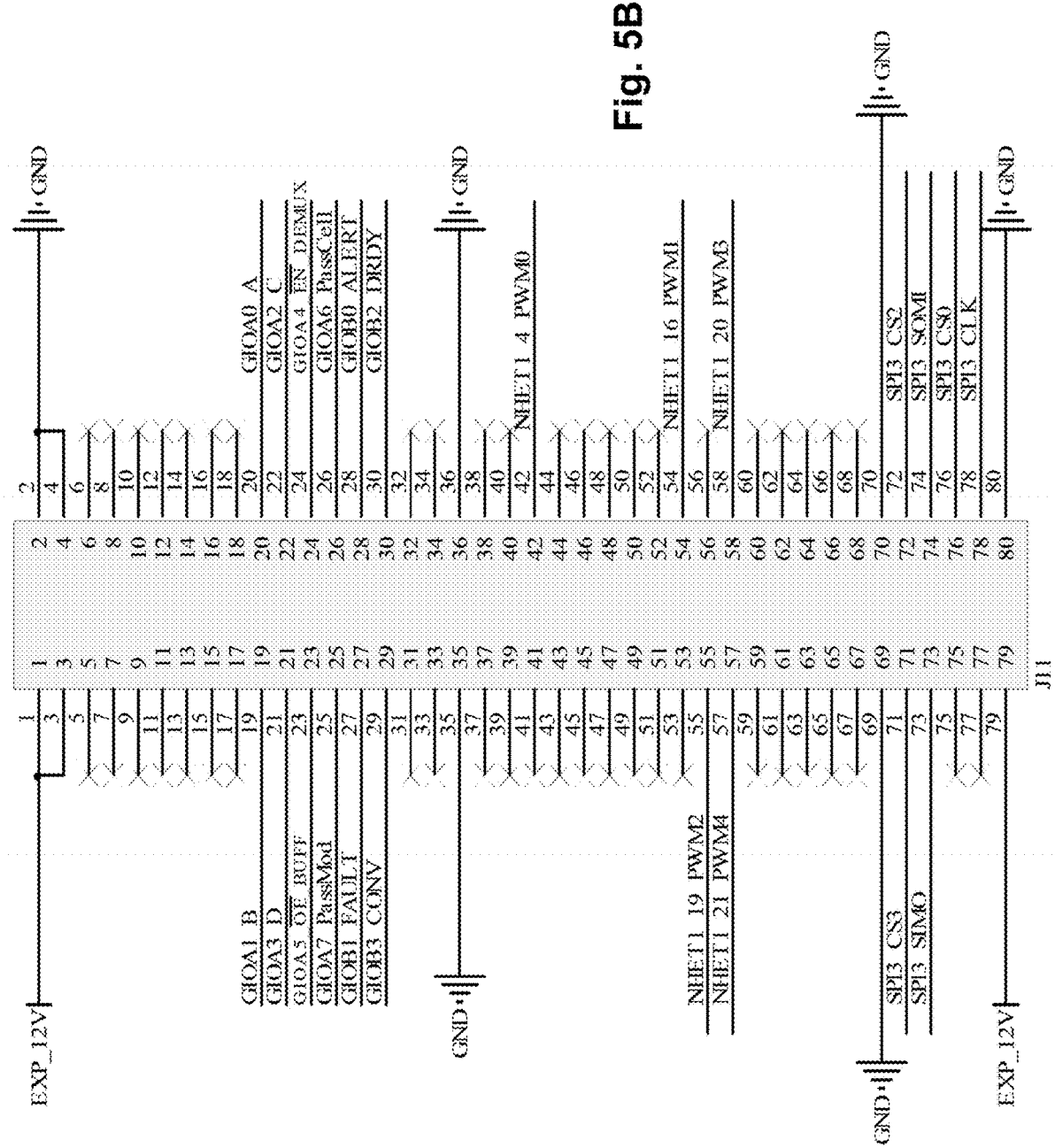
Figure 5C:
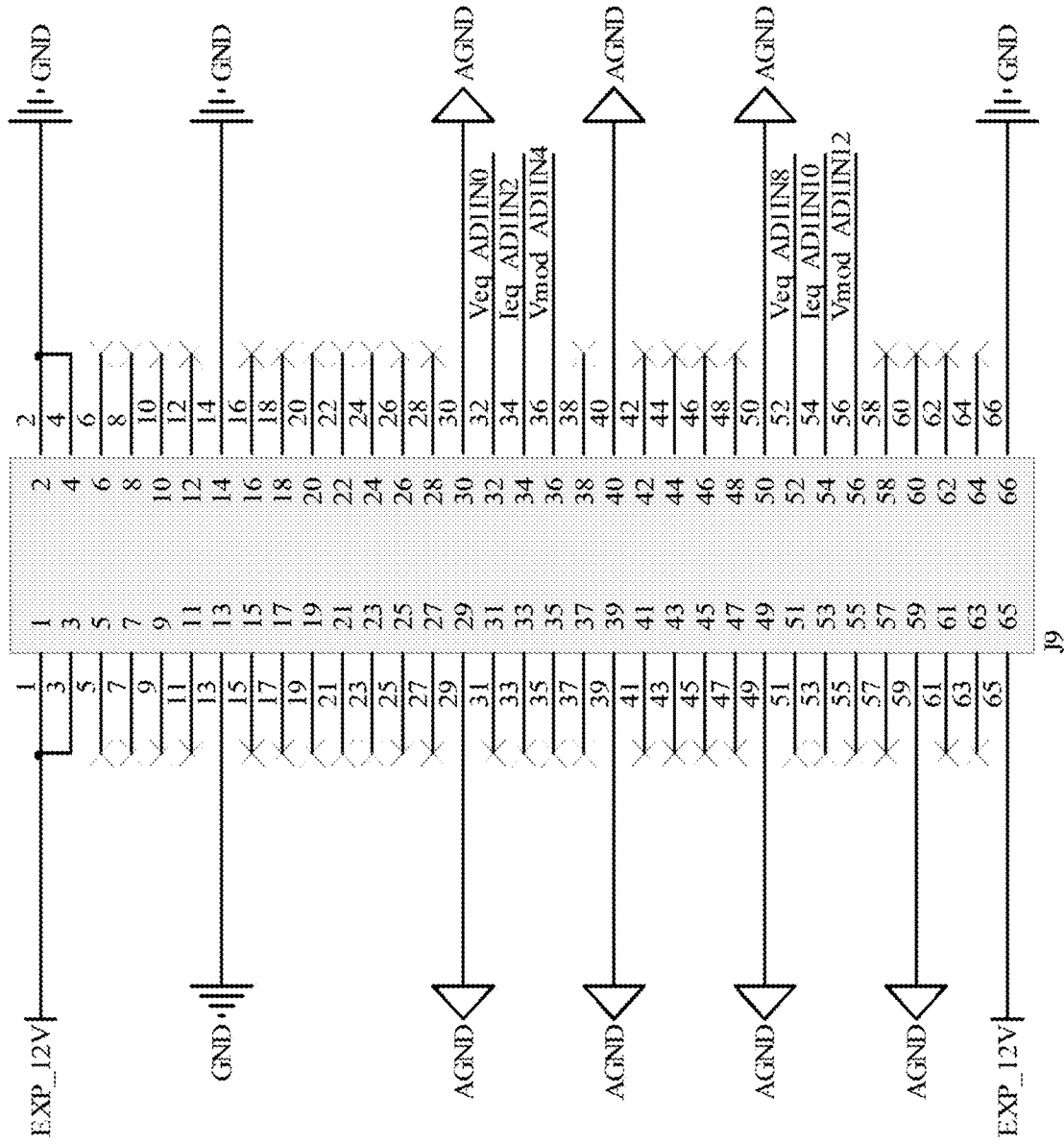
Figure 5D:
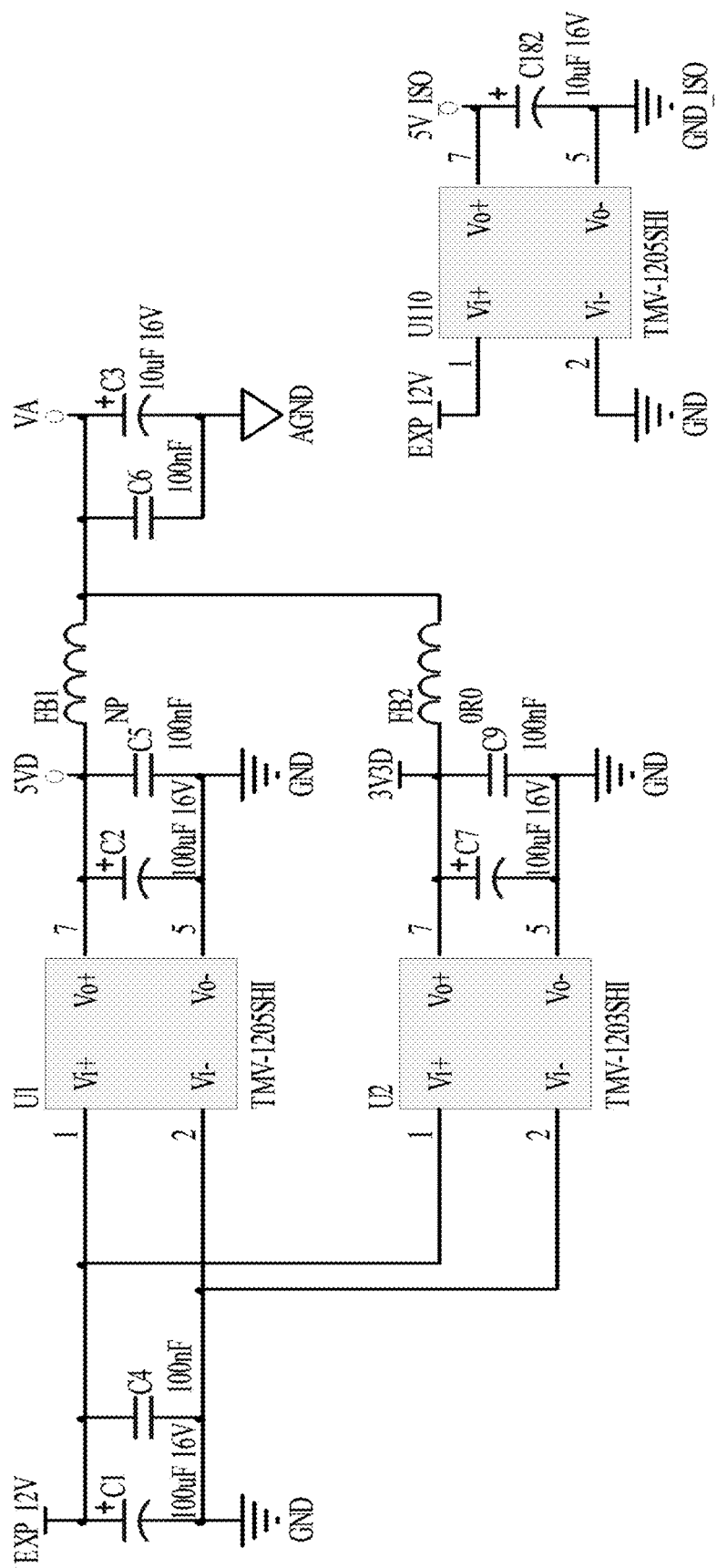
Figure 5E:
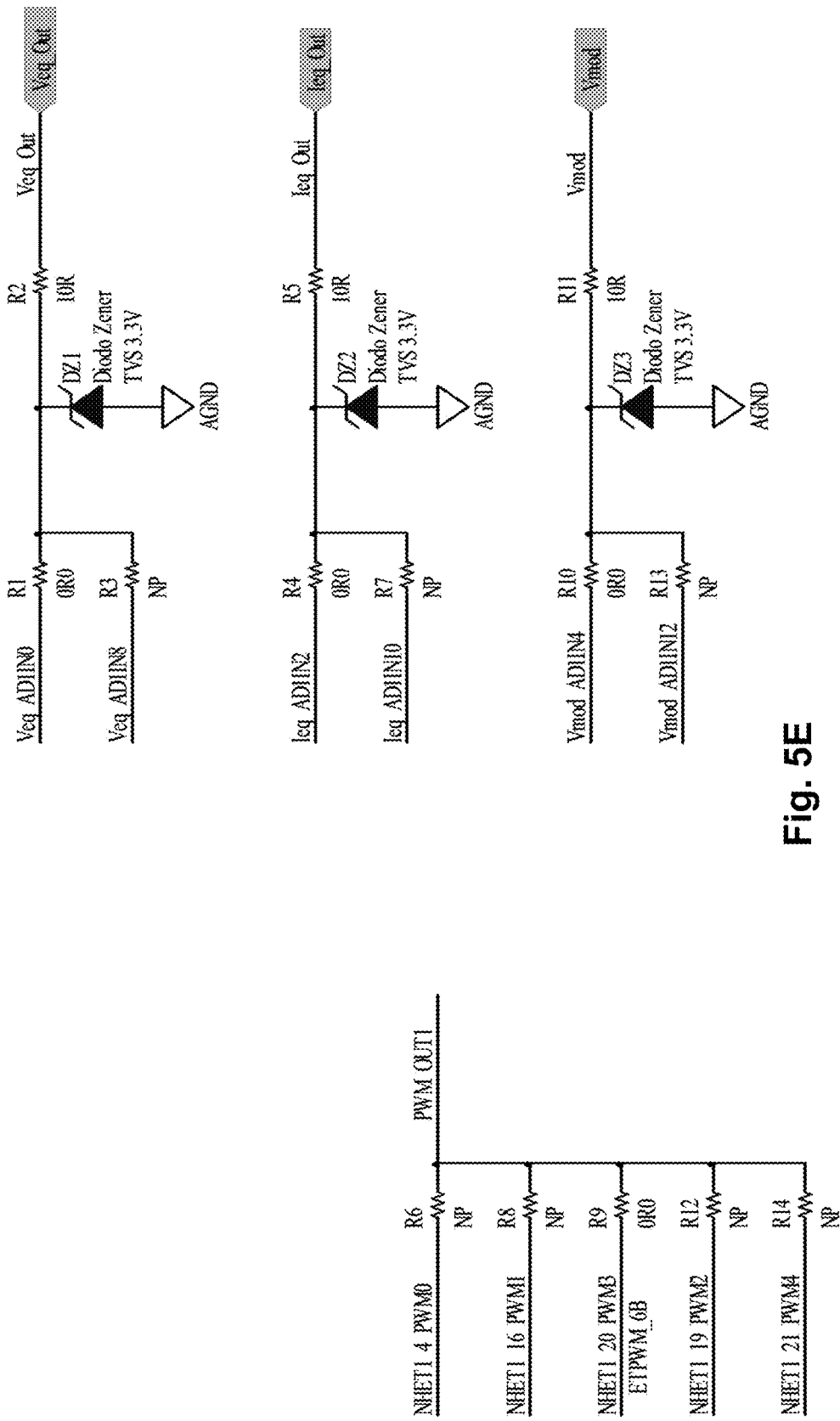
Figure 5F:
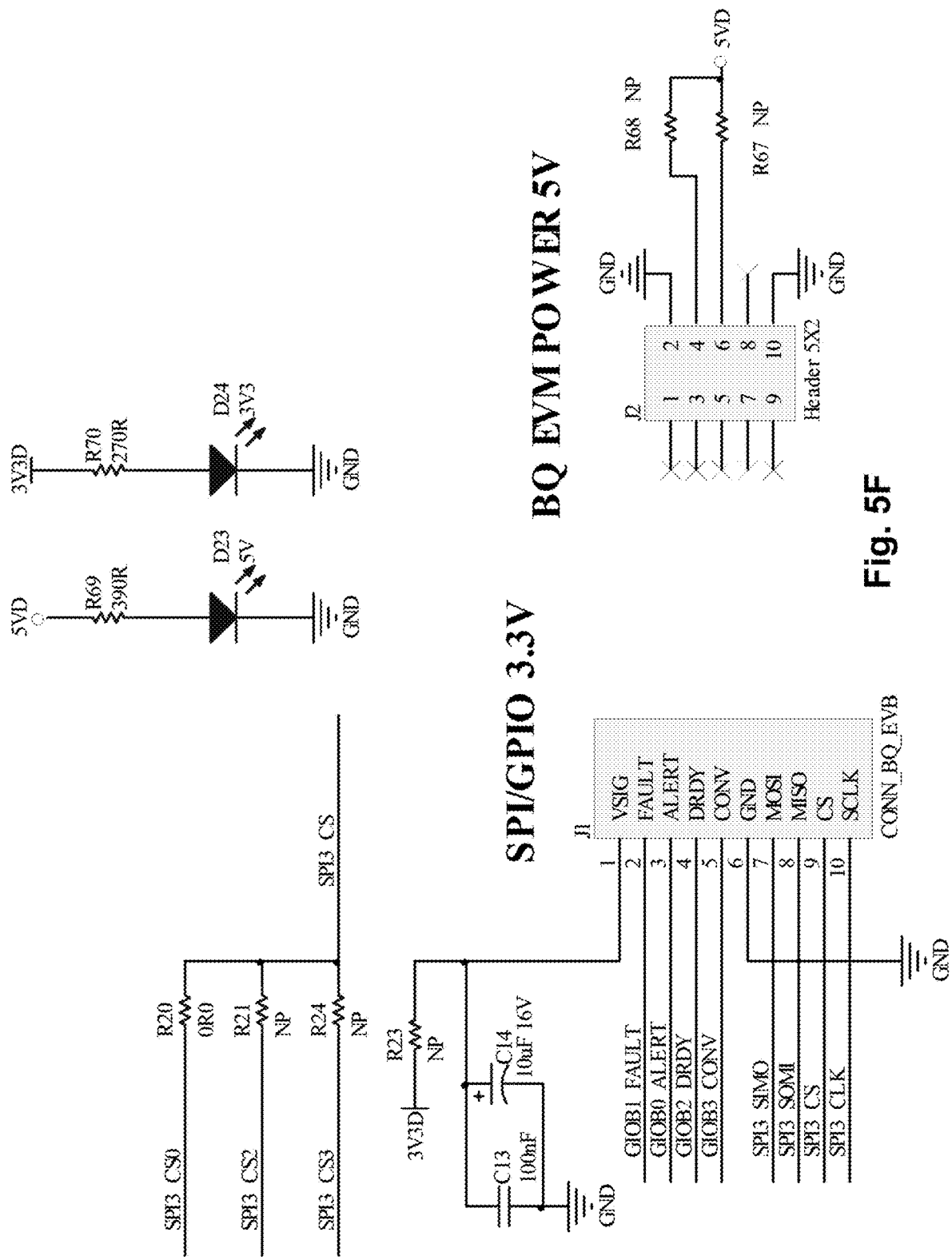
Figure 5G:
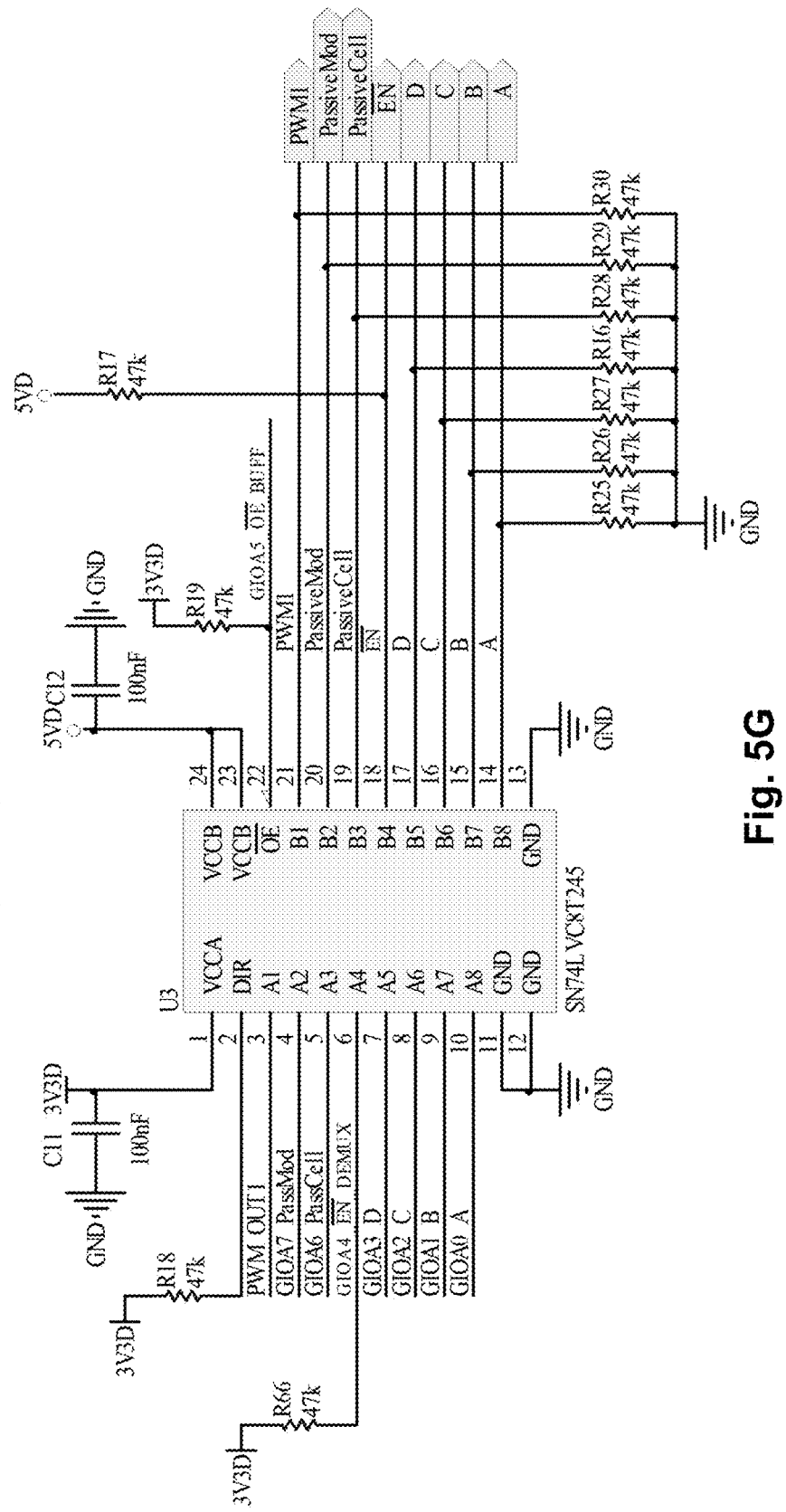
Figure 6A:
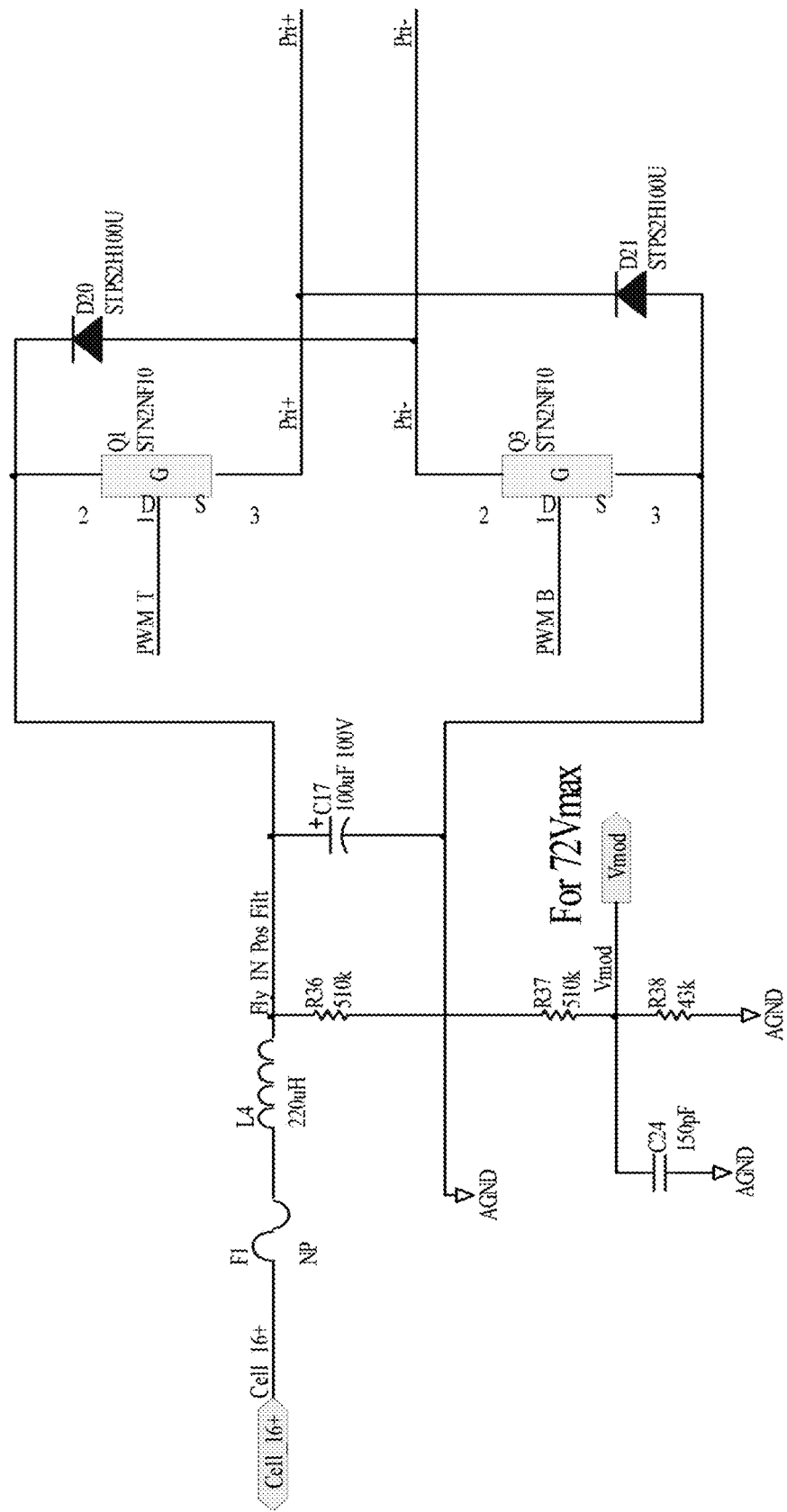
FIG. 6A through E show a schematic diagram of a dual switch isolated flyback converter used in an embodiment of the invention.
Figure 6B:
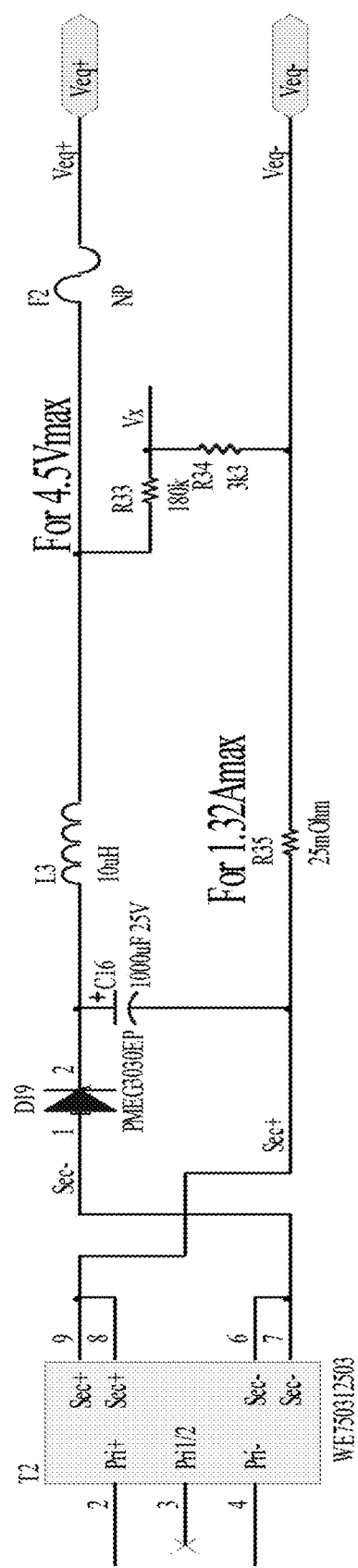
Figure 6C:
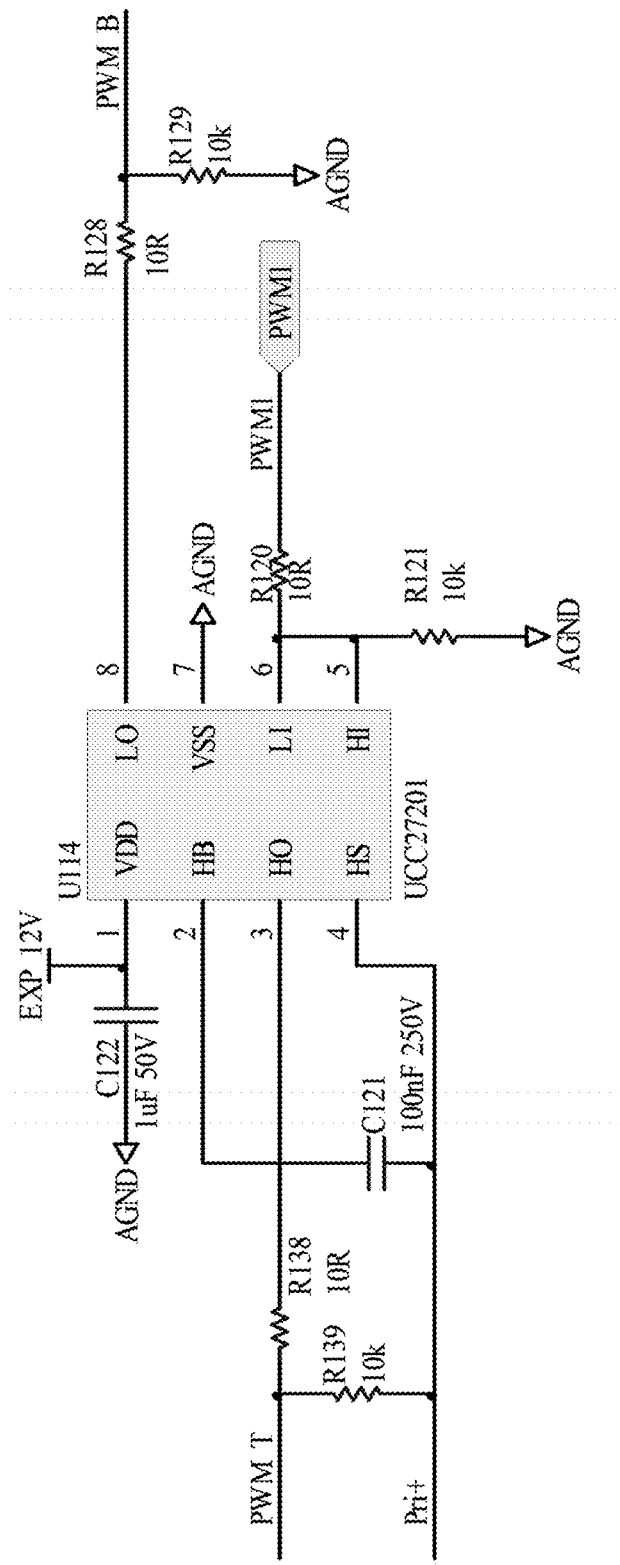
Figure 6D:
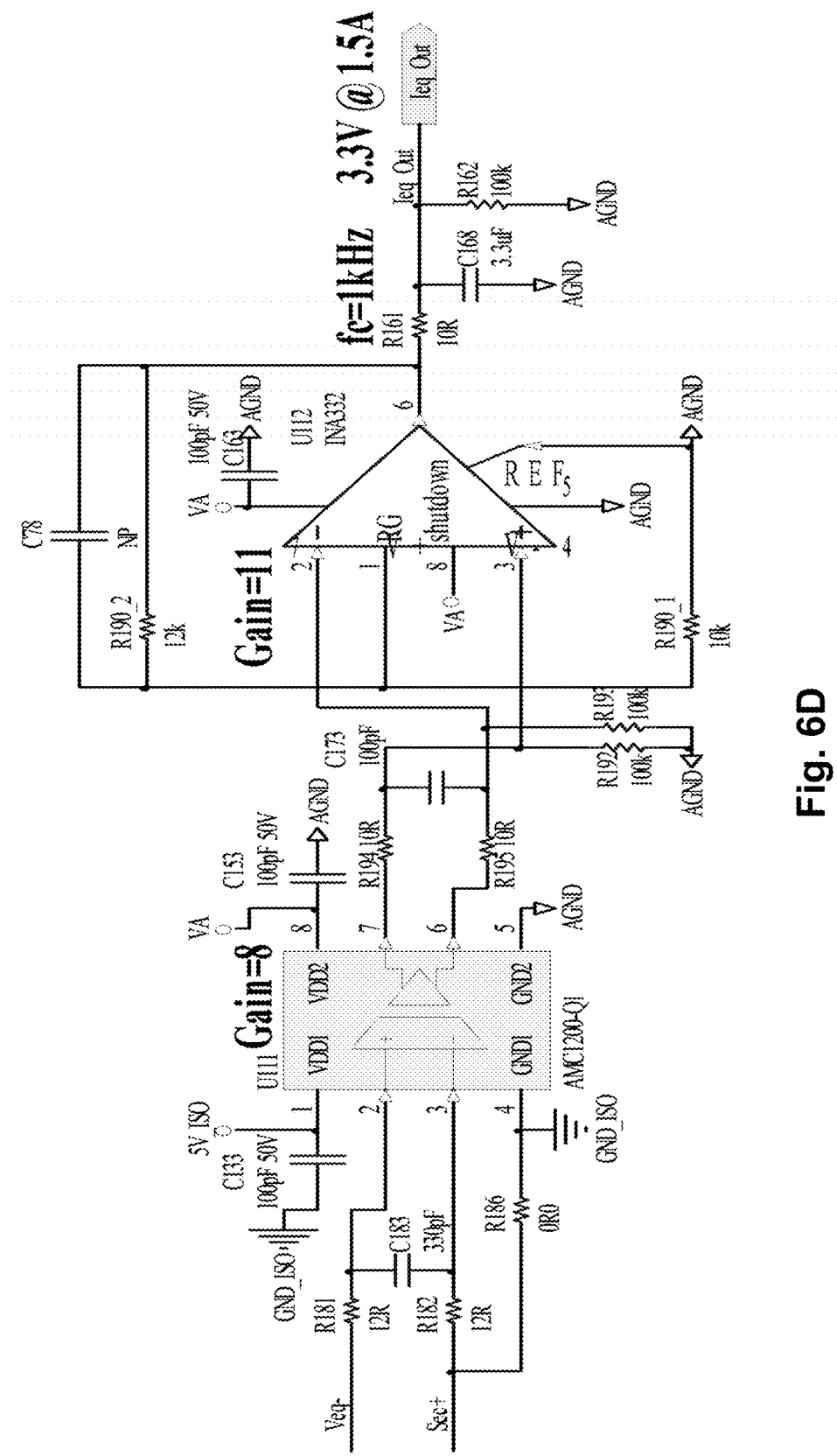
Figure 6E:
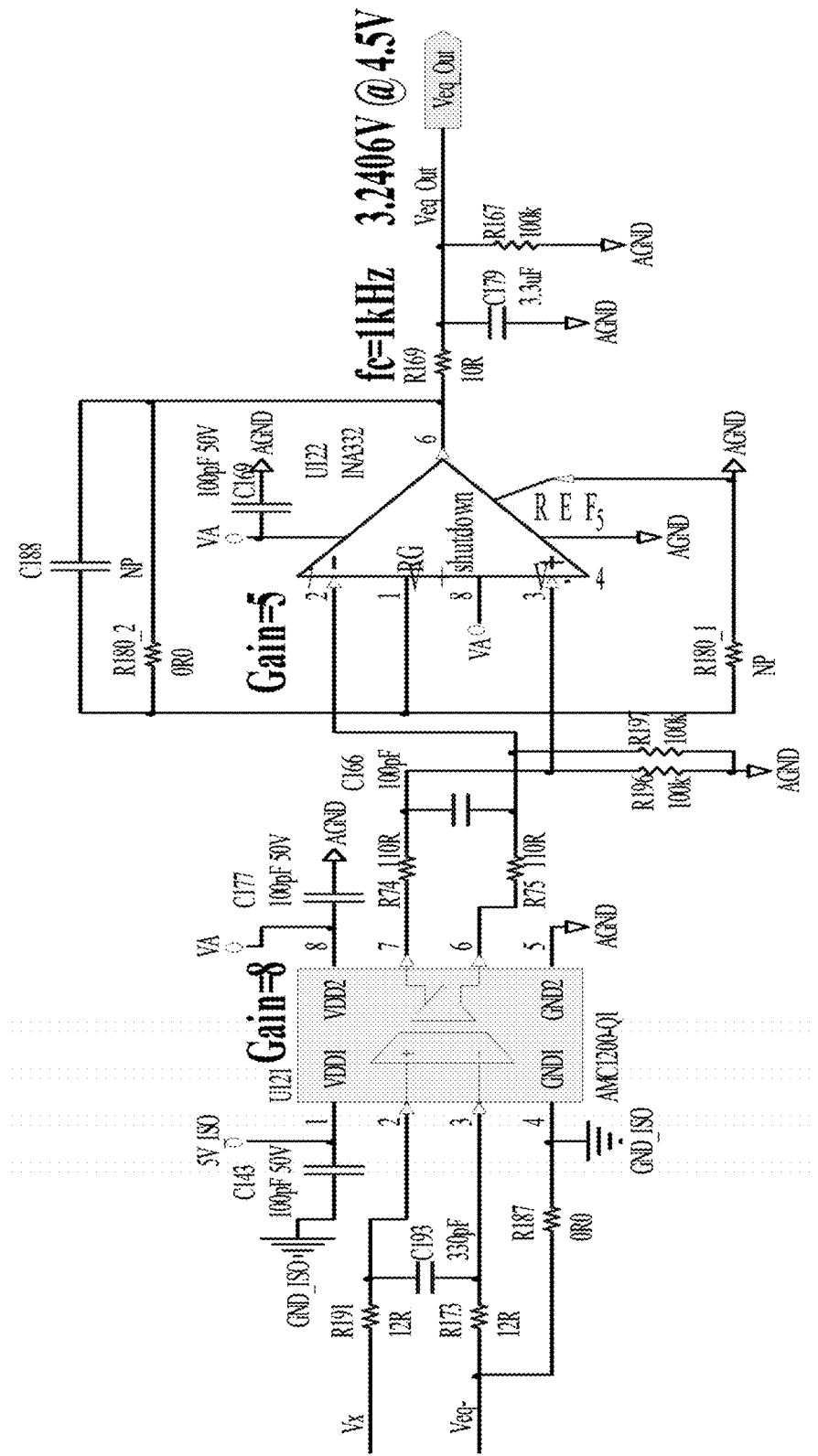
Figure 7A:
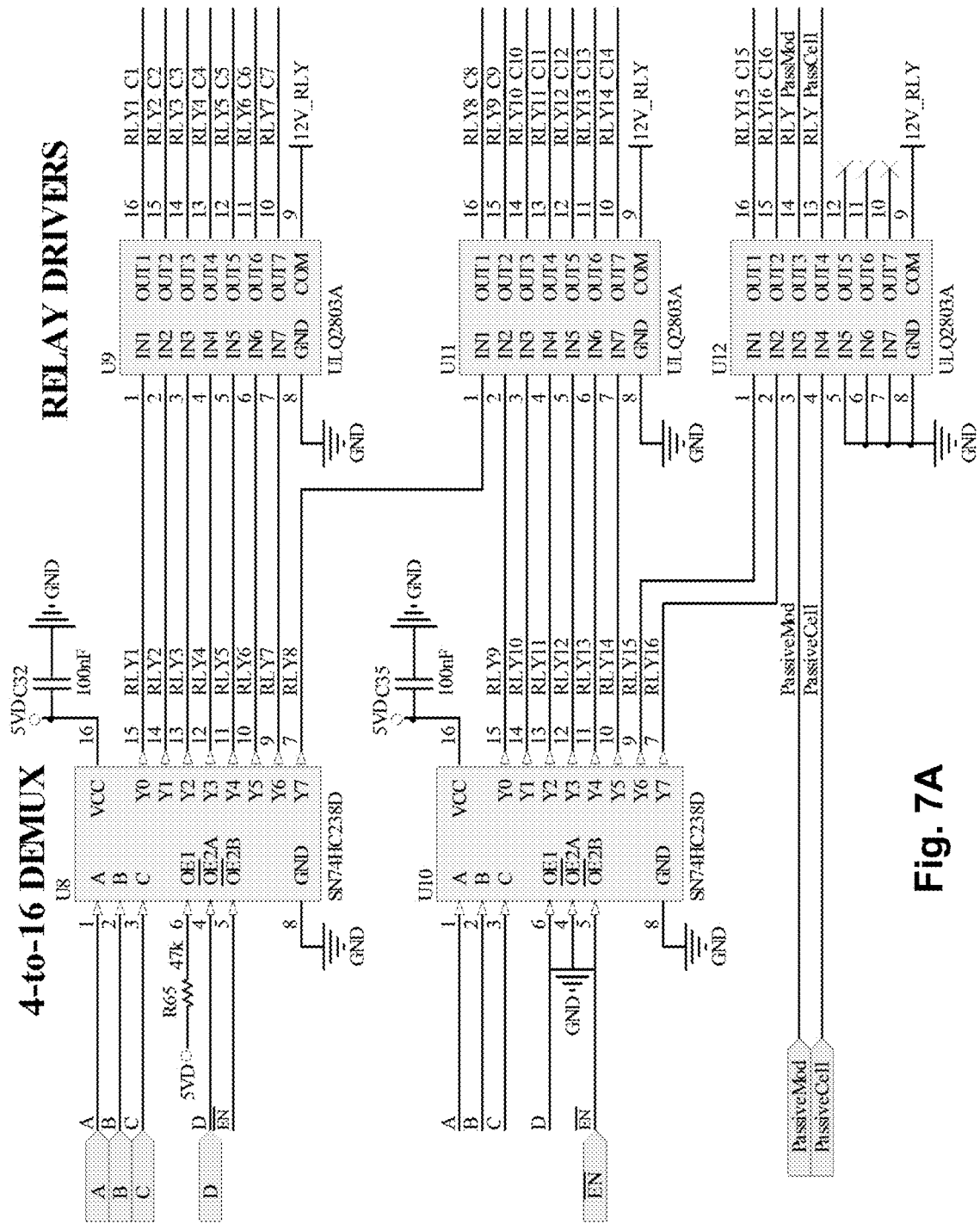
Figure 7D:
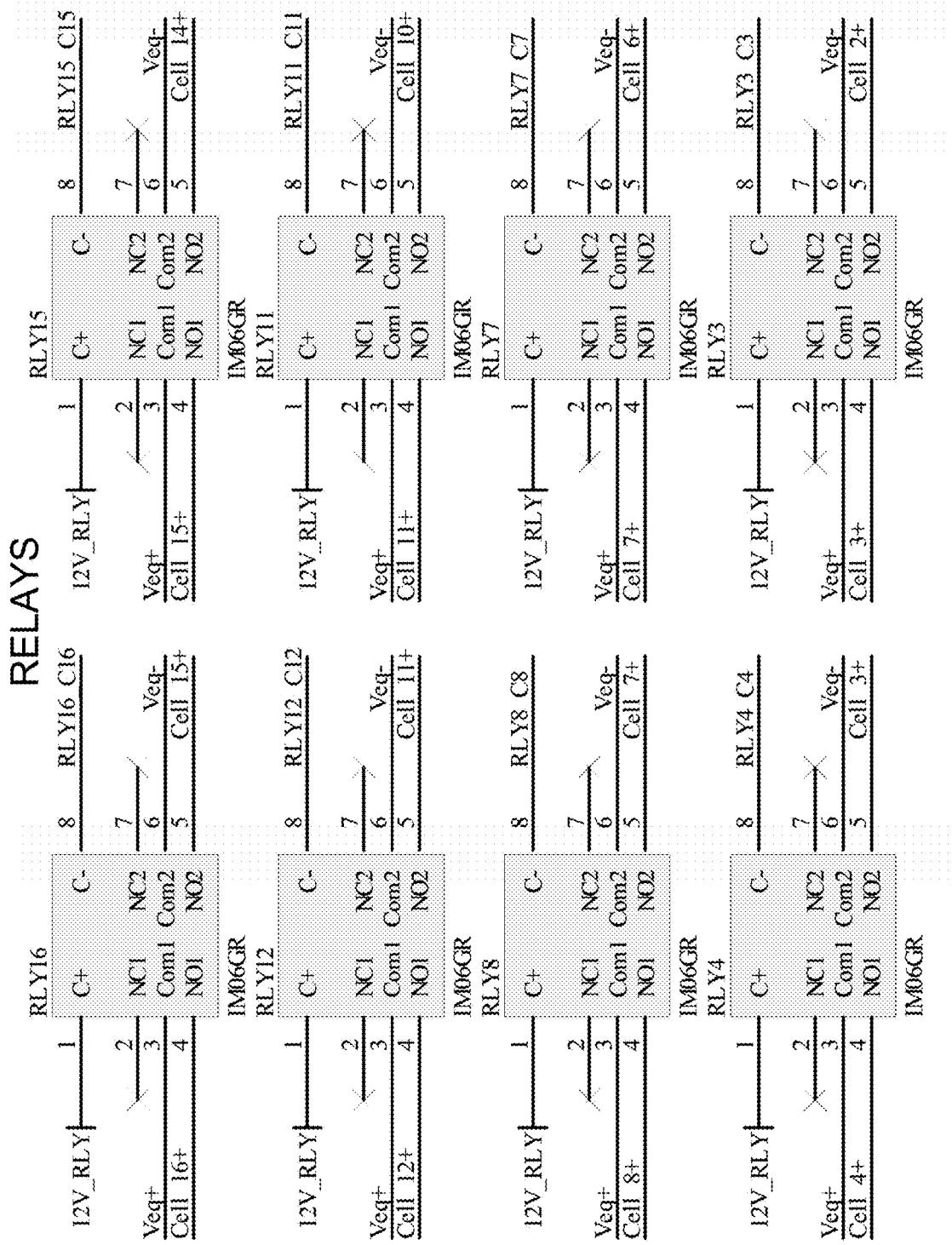
Figure 7E:
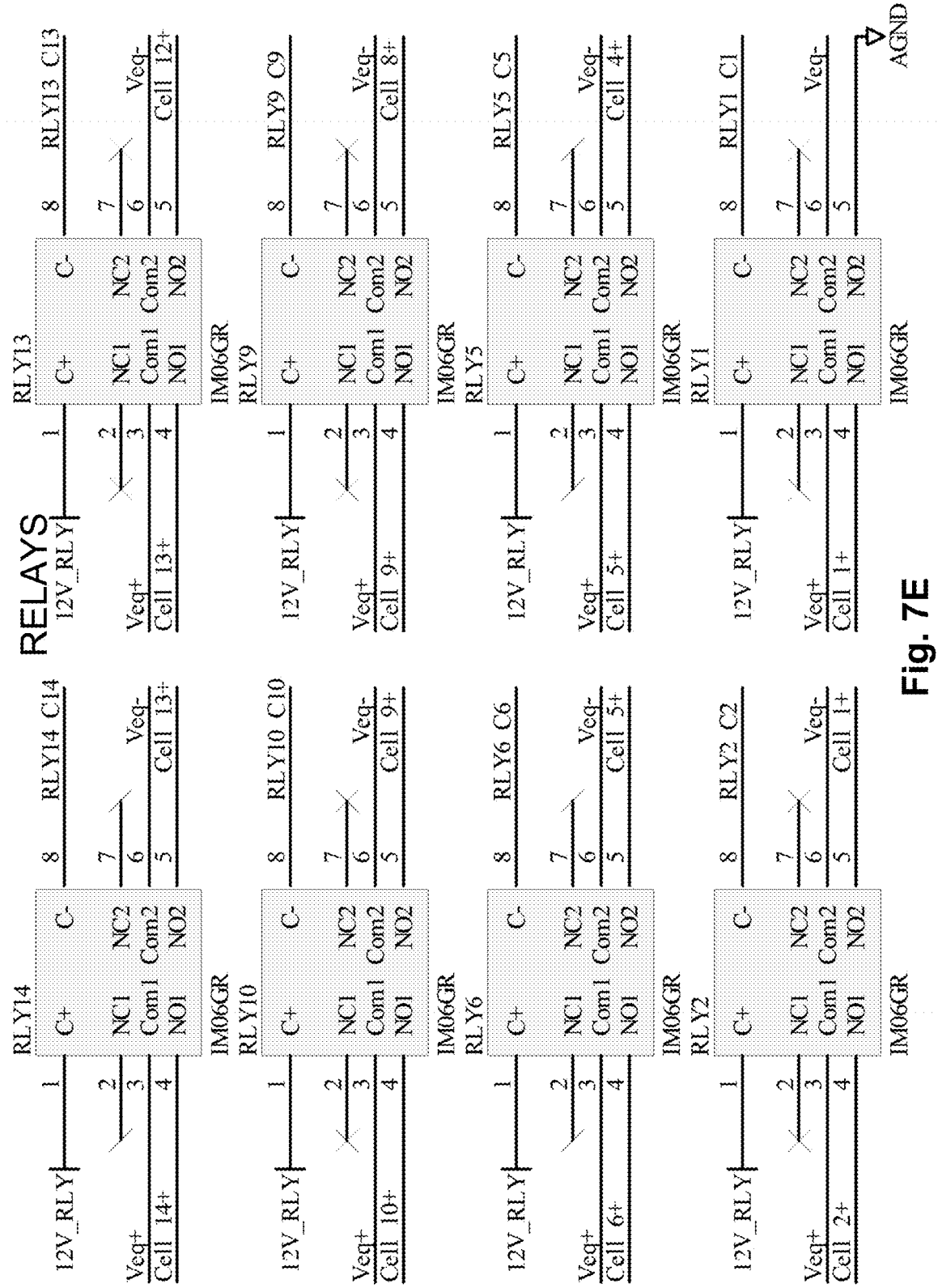
Figure 7F:
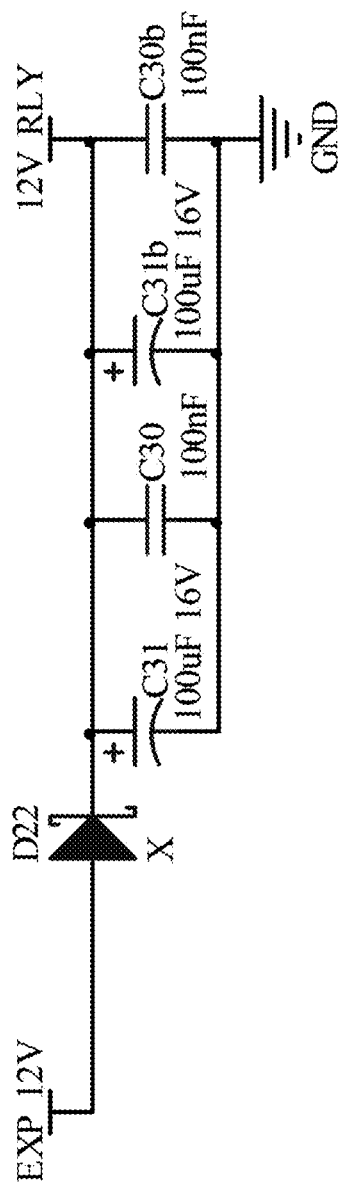
Figure 7G:
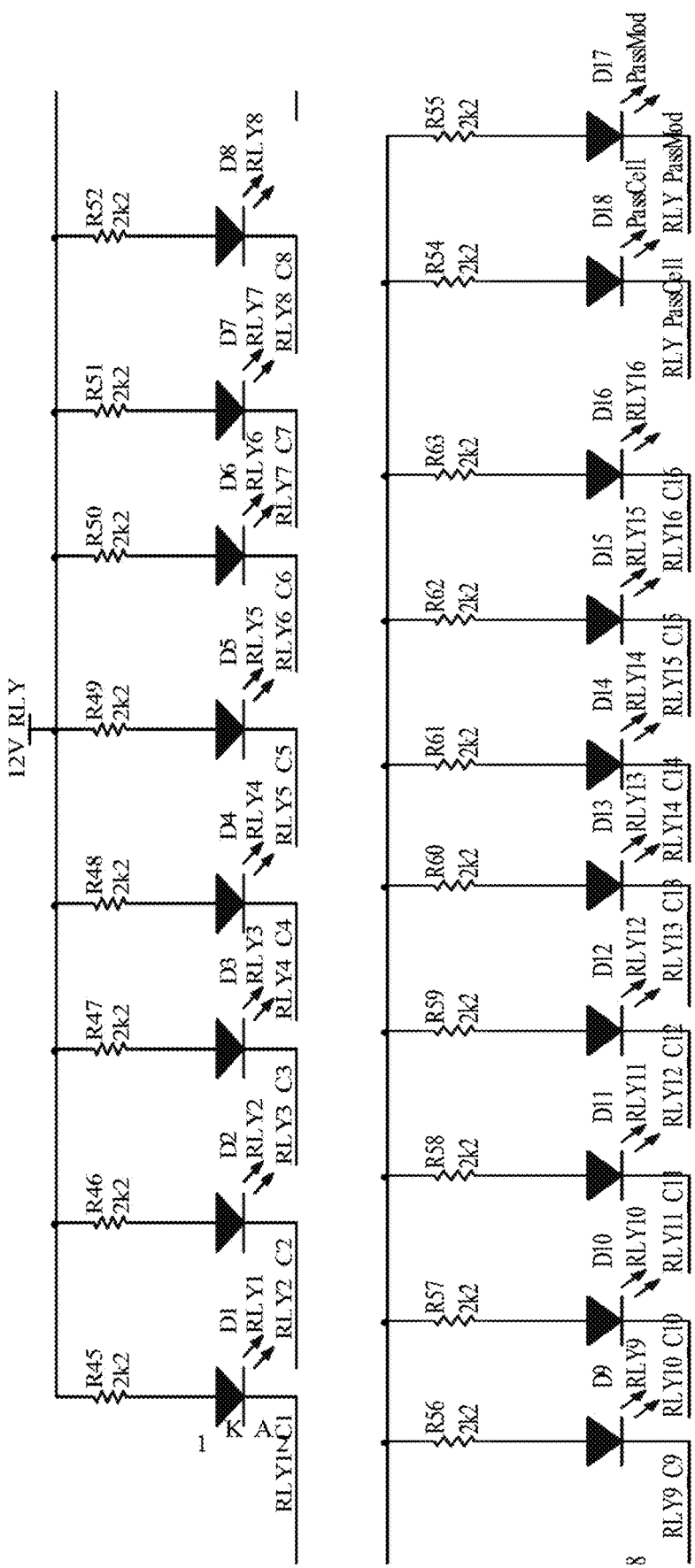

Referring to FIG. 4 there is shown a flyback_Control block that implements the control algorithm that allows re-charging a specific cell from its initial unbalanced state up to the desired balanced state. The parameters needed to control the start-stop and current injection are:

Desired output current: fixed at 1 A (Iout)
    Output current feedback: IoutDC
    Cell SOC: SOC_1
    Desired final SOC: Final_SOC There are other control parameters in the flyback_Control block related with the simulation process in PSIM (fs) and PI regulator parameters (Kp, Ki) for controlling the output current. The flyback_Control block is in an embodiment programmed in C code to make it easily portable to the HERCULES microcontroller, but it is understood that other programming languages could alternatively be used.

The most important part of the control algorithm (PI controller) implemented in the "flyback_Control" block is shown in the following:

```
...
if (SOC <= Final_SOC) //run the algorithm until Final_SOC is reached
{
// do nothing until 1ms. Simulates initialsation state of the uController
if (Tdis <= 0.001)
{
    Iout = 0;
    IoutDC_s = 0;
    Tdis = 0;
    Kp = 0;
    Ki = 0;
    err = 0;
    err_k1 = 0;
    Int = 0;
    Out = 0;
    PI_out = 0;
    y1= 0;
    y2 = 0;
    y3 = 0;
    y4 = 0;
}
else // Flyback PI control algorithm
{
    Iout = x1; // output current objective
    IoutDC_s = x2; // discretized output current feedback
// PI Controller
    err = Iout - IoutDC_s; // Error calculation
    Int = Int + (err/fs); // Integral calculation
    Out = Kp*err + Ki*Int; // PI result
    PI_out = Out;
// Saturation to avoid excesive PWM duty cycle or below 0
    if (PI_out >= 0.44)
    {
    PI_out = 0.44;
    sat = 1;
    }
        else if (PI_out <= 0)
    {
    PI_out = 0;
    sat = 2;
    }
    else sat=0;
    y1 = PI_out;
    y2 = err;
    y3 = sat;
    y4 = 1;
}// end if
}// end if SOC
else
{
    y1 = 0;
    y4 = 0;
}
```

The Hercules µC generates the PWM signal, switch (relay) selection signals, possible passive balancing activation signal/signals? for the full module and receives the feedback of the balancing output current signal to close the control loop.

The PWM signal will control? the isolated flyback DC/DC converter in order to generate the desired amount (magnitude) of current to re-charge the selected cell.

With reference to FIG. 5A through G there is shown the interface with the Hercules μC evaluation board, and also the power supply needed to generate the different supply levels, including the isolated voltage (such as 5V) needed for the output current and cell voltage measuring operational amplifiers. The schematic in FIG. 2 also shows the interface components needed to manage the different voltage levels in all the signals present in this embodiment of the invention. The analog and digital signals can be routed to different pins in the μC to allow compatibility with different combinations and configurations.

In this embodiment of the invention, the connection with the TI BQ76PL536EVM is done with an SPI bus and some digital signals, and it is present in connector J1 and J2.

With reference to FIG. 6A through E there is shown the Dual Switch isolated flyback converter. To manage both MOSFETs PWM signal, the IC U114 (UCC27201) acts as a High and Low Gate Driver, receiving the PWM signal from the μC.

The current sensor used to send the current signal to the microcontroller is in this embodiment a combination of a 25 mOhm shunt resistor and two analog amplifiers. The first one in the chain is the AMC1200-Q1. It is a balanced isolation amplifier with a fixed gain of 8× and it is powered with 5V by the TMV-1205SHI isolated DC/DC converter. The balanced output of this isolation amplifier is amplified again by the INA332 (11× for the current measurement and 5× for the voltage measurement). Both signals are given to the HERCULES μC ADC inputs on Ieq_Out and Veq_Out ports. The Module voltage is also measured by the resistor divider network and is given to the uC on Vmod port.

In this—and possibly also further embodiments of the invention, a Wurth WE750312503 isolation transformer for the flyback converter that works between 36V and 72V input voltage is used. The selected topology is the dual switch flyback and the MOSFETs reference is STN2NF10. The output diode D19 (PMEG3030EP) has been selected for its low Vf to reduce conduction looses.

With reference to FIG. 7A through G there is shown an embodiment of a Relay selection circuitry provided with de-multiplexer to avoid having 2 relays connected at the same time to different parts of the cell that would lead to a short circuit between two or more cells. The selection of the relay that connects one single cell to the flyback output is done with a logic circuitry based on SN74HC238D de-multiplexers. In this way it is ensured that only one single relay is activated at the same time, avoiding dangerous short-circuits between cells. Finally the relay is driven by a ULQ2003A darlington array that manages the relay coil activation.

There last two relays (RLY17 and RLY18) are in this embodiment used to connect a resistor in series with a single cell or with the full module to allow passive balancing and thus obtaining the Hybridized Balancing prototype. The relay selected for this application is the IMR6

Software Design

The HERCULES μC has been configured and programmed in order to control the flyback converter, using the following peripherals:

General Purpose In/Out (GPIO) pins to manage the logic circuitry that controls the Relays.

Analog to Digital Converter (ADC) Module to measure the output current.

High-End Timer (HET) Module to generate internal interruptions for the control algorithm.

Enhanced Pulse Width Modulator (ePWM) Module to generate the PWM signal.

The uC peripherals are configured as follows:
GIO: —PORT A (A5, C2, C1, E1, A6, B5, H3, M1)
ADC: —JUMPER J8 TO SELECT ADREFHI 3.3V
PIN->ADC1IN2 (V18)
TRIGGER->HET1 8
RESOLUTION->12BIT
SAMPLE TIME->1 μs
HET: —PIN->HET1 8 (E18)
PWM1
PERIOD->500 μs
ETPWM: —PERIOD->100 kHz—PIN->ETPWM6B (P2)

With the ePWM module the HERCULES μC generates a PWM signal capable to control the flyback converter. With the HET Module a signal is generated to trigger the conversion of the ADC at an appropriate frequency, such as 2 kHz, which captures the measured value of the current sensor. The μC receives the analog signal from the current sensor in order to close the control loop, performing as a PI controller. Using the GPIO of the Port A, the μC selects the cell to be recharged. If desired, the μC also enables the passive balancing for one cell or for the full module.

Tests have been carried out with the Dual Switch flyback converter charging one Cell at a fixed and controlled current of 1 A. The core of the active balancing circuitry is the isolated flyback converter. The flyback converter is controlled by the HERCULES μC with a PWM signal (ETPWM 6B pin) and the control loop is feed by the analog signal that corresponds with the output current (AD1IN2 pin).

The HERCULES uC is able to select the cell that needs to be recharged thanks to the logic circuitry attached to GIOA port. Lines GIOA0 to GIOA3 are used to select the cell from 1 to 16 and GIOA5 is used to enable the output from the 3.3V-to-5V buffer and GIOA4 is used to enable the output of the de-multiplexers. Both enable signals are active low signals.

Once the cell is selected, the μC starts to control the PWM signal of the flyback converter in order to recharge the selected cell at 1 A rate. The cell model used in these tests is the Kokam SLPB90255255H.

The measurements done during the balancing tests show that the circuitry and control code designed are able to control the amount of current injected into the selected cell. The precision of the output current value is ±1.5%.

The efficiency of the power conversion in the flyback converter is above 82.5% in most input/output conditions, arriving to efficiency peaks of around 87.5% when the input voltage is around 55V.

Passive balancing has also been tested by connecting one 4 Ω resistor (5 W) to discharge a single cell at a rate of around 1 A, and one 68 Ω resistor (100 W) to discharge the full 16 cell module at a rate of around 1 A. It is understood that different resistor values could be used and that passive balancing could be carried out by other means than by resistors.

Simulation Results.

In the following results of PSIM simulations for 16 and 8 cells modules are shown.

Figure 8:
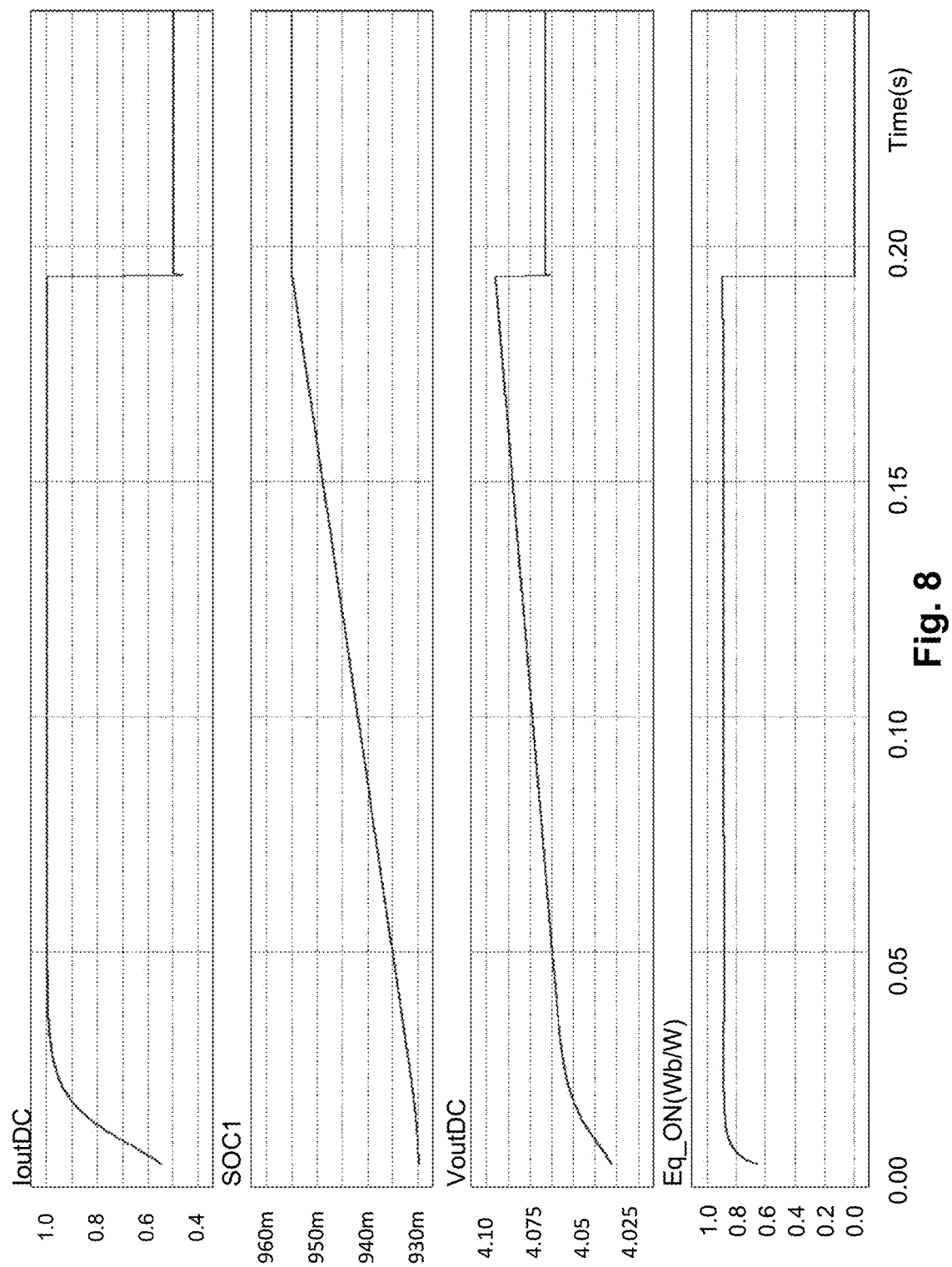
FIG. 8 shows a plot of simulation results for a 16 cell module.

Referring to FIG. 8 there is shown results obtained for a simulation of a balancing process of 1 cell that needs to go from a 90% SOC until a 95% SOC. The input voltage for the flyback is 64.45V, equivalent to 16 cells where 15 cells are charged at SOC 95% and 1 cell is charged at 90%. This last cell is the one that will be balanced.

The current "IoutDC" is increased until it reaches 1 A and then remains steady until the SOC reaches a charge of 95%, then it stops.

The SOC (SOC_1) and the Cell Voltage (VoutDC) as a function of time are also shown.

Finally the bottom graph of FIG. 8 shows the power conversion efficiency in the simulation considering conduction losses, during the time when the flyback converter is ON. The value of the efficiency in this simulation is 89%.

Figure 9:
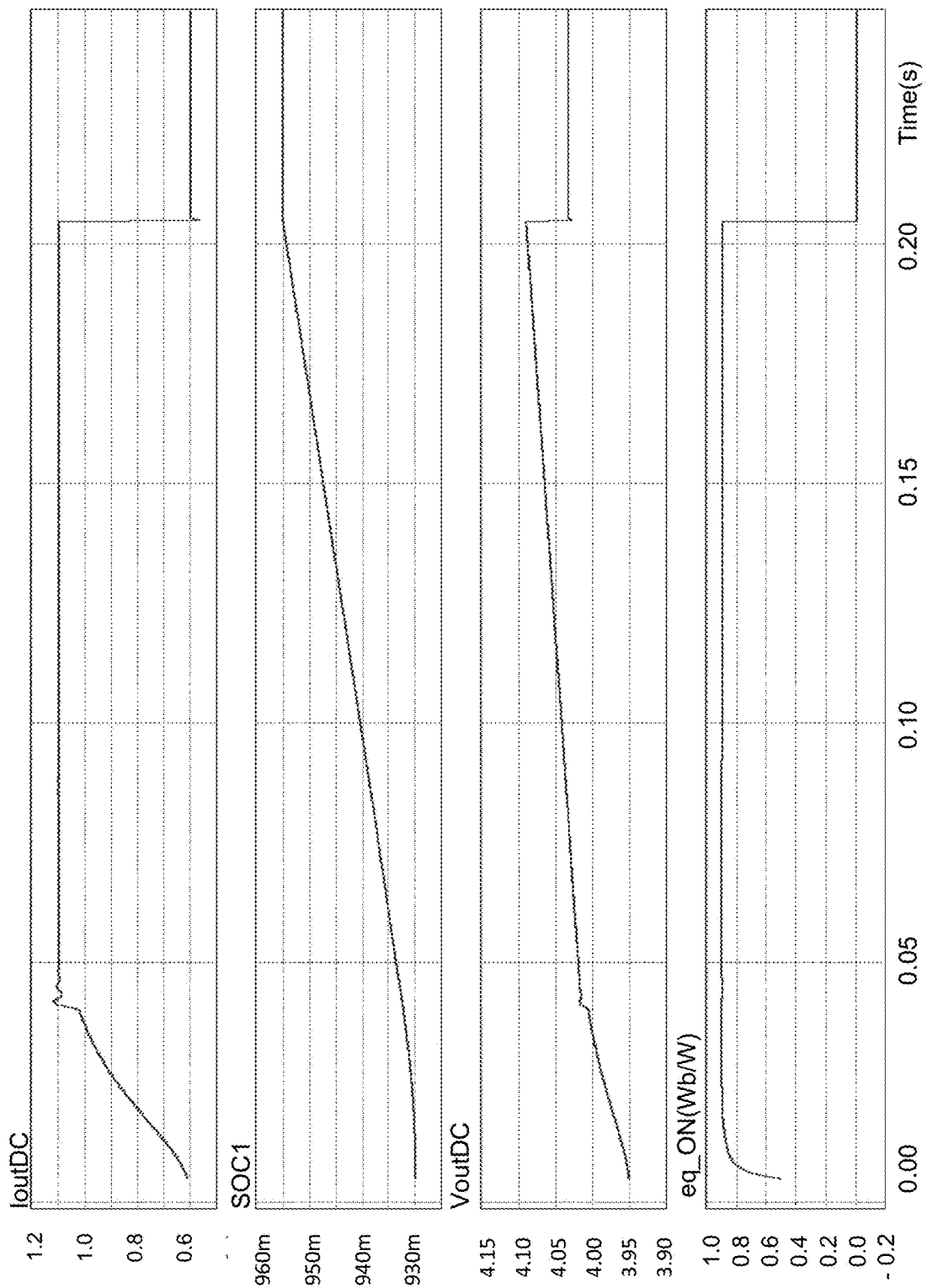
FIG. 9 shows a plot of simulation results for a 8 cell module.

Referring to FIG. 9 there is shown results obtained for a simulation of a balancing process of 1 cell that needs to be charged from a 90% SOC until a 95% SOC. The input voltage for the flyback is 32.18V, equivalent to 8 cells where 7 cells are charged at 95% SOC and 1 cell is charged at 90%. This last cell is the one that will be balanced. The rest of the signals are the same as for the results shown in FIG. 8.

In summary, it can be seen from the plots shown in FIGS. 8 and 9 that the controlled flyback power supply according to an embodiment of the invention is able to recharge the specific cell at a constant current of 1 A until its SOC reaches the desired value.

The invention claimed is:

1. A system for battery cell balancing comprising:
a cell monitoring block configured to monitor the voltage or a related quantity across individual cells ($C_1$, $C_2$, ... $C_N$) in a battery cell module;
a microcontroller configured for monitoring the positive terminal voltage and the negative terminal voltage of said battery cell module, and for monitoring the output current $I_{mod}$ of said module, and monitored cell voltage of said individual cells ($C_1$, $C_2$, ... $C_N$), where the microcontroller is configured to provide a control signal based on at least said positive terminal voltage, said negative terminal voltage, said output current $I_{mod}$ of said module, and said monitored cell voltage of said individual cells; and
a hybrid module balancing block configured to provide either an active or a passive cell balancing or a combination of active and passive cell balancing between the individual cells ($C_1$, $C_2$, ... $C_N$) in the specific battery cell module under the control of the control signal provided by the microcontroller,
wherein the microcontroller and the hybrid module balancing block are configured to, subsequent to providing the active cell balancing between the individual cells ($C_1$, $C_2$, ... $C_N$) of said specific battery cell module, responsive to state of charge (SOC) of one or more of the individual cells ($C_1$, $C_2$, ... $C_N$) being above a predefined upper limit, provide the passive cell balancing of the individual cells ($C_1$, $C_2$, ... $C_N$) of said specific battery cell module, and
wherein the predefined upper limit is a maximum allowable SOC of the cells ($C_1$, $C_2$, ... $C_N$) or a SOC average value of the said specific battery cell module.

2. The system according to claim 1, wherein said hybrid module balancing block comprises:
a switching array configured to provide active or passive or a combination of active and passive balancing to one or more of said individual cells ($C_1$, $C_2$, ... $C_N$) in said specific module under the control of said control signal;
a passive cell balancing means configured to provide said passive balancing under the control of said control signal;
an active cell balancing means configured to provide said active balancing under the control of said control signal.

3. The system according to claim 1 comprising a passive module balancing means coupled between the positive and negative terminals of said specific module.

4. The system according to claim 2, wherein said active cell balancing means is a flyback DC/DC converter.

5. The system according to claim 2, wherein said passive cell balancing means is a resistor in series with a switch, such as for instance a MOSFET.

6. The system according to claim 3, wherein said passive module balancing means is a resistor in series with a switch, such as for instance a MOSFET.

7. The system according to claim 4, wherein the flyback DC/DC converter extracts power from all of the cells ($C_1$, $C_2$, ... $C_N$) of a module, and injects a controlled current to balance the most discharged cell until it is in balance with the other cells.

8. The system according to claim 7, wherein said controlled current is constant.

9. The system according to claim 1, wherein said microcontroller is a microcontroller in a battery management system (BMS) that manages the overall performance of the battery.

10. The system according to claim 1, wherein active balancing as applied in the modules making up a battery, whereas passive balancing is applied between two or more modules making up the battery.

11. The system according to claim 10, wherein the system comprises module SOC monitoring means or voltage monitoring means that monitors the SOC or voltage of the modules in a battery and when an imbalance between the SOC or voltage is detected between two or more modules, passive balancing between the two or more modules in the battery is performed.

12. The system according to claim 10, wherein the passive balancing between two or more modules in a battery is controlled by said hybrid module balancing block or said battery management system (BMS).

13. A method for battery cell balancing in a battery comprising at least one module comprising a plurality of cells, the method comprising the steps of:
determining if a charging process is in progress;
choosing a module (M1);
applying active cell balancing between the individual cells of said module (M1);
subsequent to providing the active cell balancing between the individual cells of said module (M1):
determining if one or more of the individual cells of said module (M1) are charged above a predefined upper limit, wherein the predefined upper limit is a maximum allowable state of charge (SOC) of the cells or a SOC average value of the cells in said module (M1);
if the one or more cells in said module (M1) are charged above said upper limit, applying passive cell balancing to the one or more individual cells in said module (M1) in order to reduce their respective charge to a value at or below said upper limit;
when all cells within said module (M1) are charged, determine if there are further modules (M2, M3 ... ) in the battery, and if this is the case repeat the above steps for the remaining modules (M2, M3 ... );
when all modules of the battery have been charged, determine if there is an imbalance between the SOC or a similar parameter of the respective modules in the battery, and if this is the case, apply either passive or active balancing between respective modules in order to reduce said imbalance between modules to a required level.

14. The method according to claim 13, wherein active balancing as applied in modules making up a battery, whereas passive balancing is applied between modules making up the battery.

15. The method according to claim 14, wherein the SOC or voltage is monitored by monitoring means that monitors the SOC or voltage of two or more modules in a battery and when an imbalance between the SOC or voltage is detected between two or more modules, passive balancing between the two or more modules in the battery is performed.

* * * * *